(12) United States Patent
Klinger

(10) Patent No.: US 11,209,560 B2
(45) Date of Patent: Dec. 28, 2021

(54) ASSIGNMENT OF SYSTEMS TRACTS

(71) Applicant: Schlumberger Technology Corporation, Sugar Land, TX (US)

(72) Inventor: Jimmy Klinger, Saint Martin de Londres (FR)

(73) Assignee: Schlumberger Technology Corporation, Sugar Land, TX (US)

(*) Notice: Subject to any disclaimer, the term of this patent is extended or adjusted under 35 U.S.C. 154(b) by 597 days.

(21) Appl. No.: 15/747,114

(22) PCT Filed: Jul. 14, 2016

(86) PCT No.: PCT/EP2016/066823
§ 371 (c)(1),
(2) Date: Jan. 23, 2018

(87) PCT Pub. No.: WO2017/016895
PCT Pub. Date: Feb. 2, 2017

(65) Prior Publication Data
US 2018/0217283 A1    Aug. 2, 2018

(30) Foreign Application Priority Data
Jul. 30, 2015 (FR) .................................... 1557286

(51) Int. Cl.
*G01V 1/30* (2006.01)
*G01V 99/00* (2009.01)

(52) U.S. Cl.
CPC ............ *G01V 1/302* (2013.01); *G01V 99/005* (2013.01); *G01V 2210/6161* (2013.01); *G01V 2210/642* (2013.01)

(58) Field of Classification Search
CPC ................. G01V 1/302; G01V 99/005; G01V 2210/642; G01V 2210/6161
See application file for complete search history.

(56) References Cited

U.S. PATENT DOCUMENTS

| | | | |
|---|---|---|---|
| 2003/0144796 A1 | 7/2003 | Anstey et al. | |
| 2015/0066460 A1* | 3/2015 | Klinger | G06F 17/5018 703/2 |
| 2017/0248719 A1* | 8/2017 | Holman | G01V 1/28 |
| 2017/0315265 A1* | 11/2017 | Ross | G01V 1/302 |

OTHER PUBLICATIONS

Kominz, "Sea Level Variations Over Geologic Time", 2001. (Year: 2001).*
International Preliminary Report on Patentabiligy for the equivalent International patent application PCT/EP2016/066823 dated Feb. 8, 2018.

(Continued)

*Primary Examiner* — Regis J Betsch
*Assistant Examiner* — Jeremy A Delozier

(57) ABSTRACT

A method (1310) for attributing a systems tract to a geological environment, including computing (1314) a shelf break for a geologic environment based at least in part on implicit function values associated with the geologic environment; identifying (1318) sea level variations with respect to geological time for the shelf break; and assigning (1322) at least one systems tract to the geologic environment based at least in part on the sea level variations.

17 Claims, 17 Drawing Sheets

(56) References Cited

OTHER PUBLICATIONS

Donovan, "What are the Shelf and Slope Breaks and Why the Rise and Run of the Intervening Slope Matters for Deep-Water Plays and Sequence Models," Houston Geological Society Bulletin, General Dinner Meeting, May 10, 2010.
Risch, et al., "How Modern Techniques Improve Seismic Interpretation," World Oil, Gul Publishing Company, vol. 215, No. 5, May 1, 1994, pp. 63-68.
Riveneas, "Application of a Dual-Lithology, Depth-Dependent Diffusion Equation in Stratigraphic Simulation," Basin Research, Blackwell, Oxford, GB, vol. 4, Issue 2, Jan. 1, 1992, pp. 133-146.
Trabant, "Sequence Stratigraphy used to Map Shallow Seafloor Hazards," Offshore, Pennwell, Tulsa, OK, US, vol. 53, No. 10, Oct. 1, 1993.
Search Report for the equivalent French patent application 1557286 dated Jun. 2, 2016.
International Search Report and Written Opinion for the equivalent International patent application PCT/EP2016/066823 dated Dec. 8, 2016.
Communication Pursuant to Article 94(3) EPC issued in Equivalent European Patent Application 16742216.1 dated Jul. 19, 2021, 8 pages.

\* cited by examiner

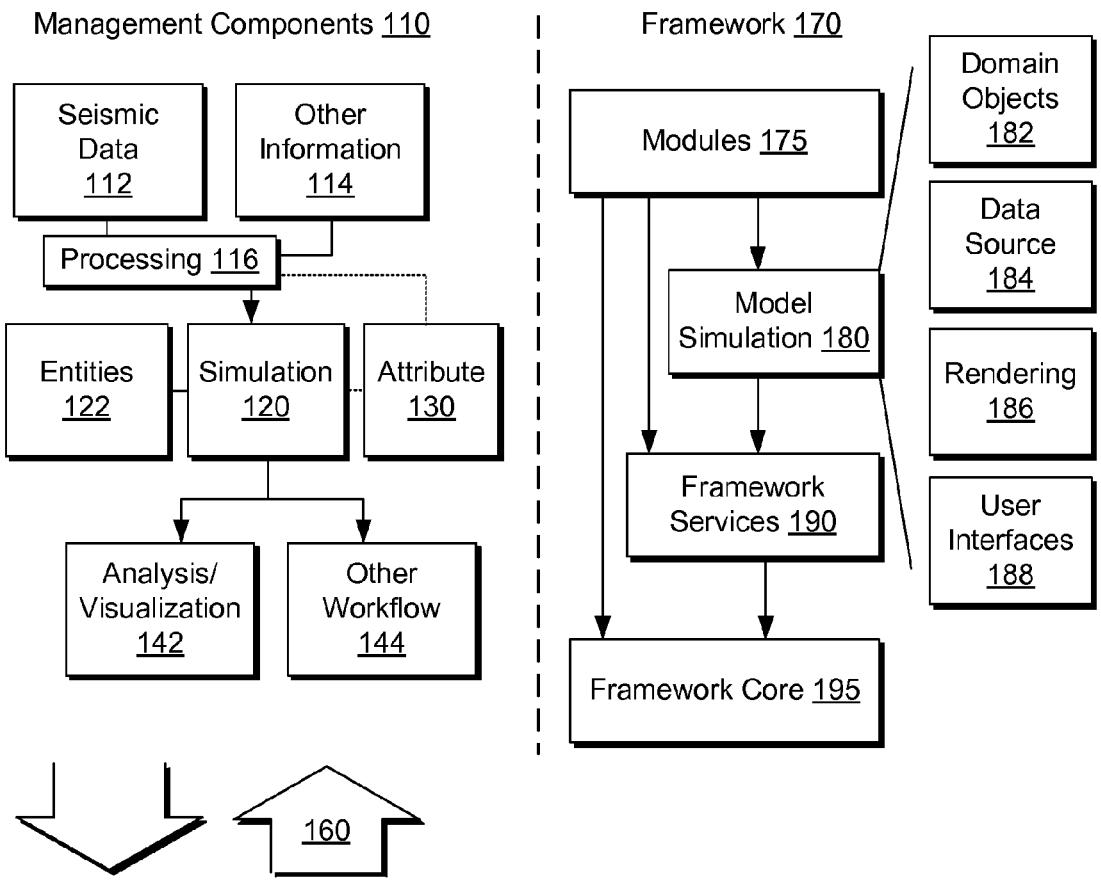
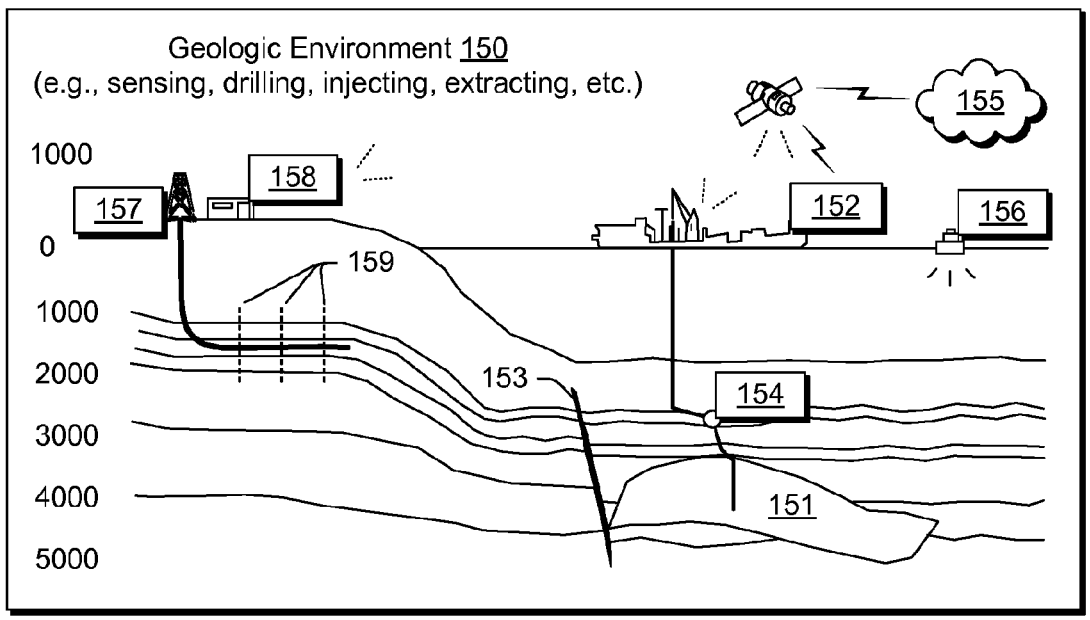
Fig. 1

Control Point Constraints 510

$$[1, x^*, y^*, z^*] \cdot M^{-1} \cdot \begin{bmatrix} \varphi(a_0) \\ \varphi(a_1) \\ \varphi(a_2) \\ \varphi(a_3) \end{bmatrix} = \phi$$

Where: $M = \begin{bmatrix} 1 & x_0 & y_0 & z_0 \\ 1 & x_1 & y_1 & z_1 \\ 1 & x_2 & y_2 & z_2 \\ 1 & x_3 & y_3 & z_3 \end{bmatrix}$

Linear System 530

$$A = \begin{bmatrix} C_{harmonic\ equations} \\ C_{control\ point\ equations} \\ C_{gradient\ equations} \\ C_{const.\ gradient\ equations} \end{bmatrix} \quad F = \begin{bmatrix} 0 \\ \phi_{control\ point} \\ \phi_{gradient} \\ 0 \end{bmatrix}$$

Number of Nodes · (Number of Constraints)

$$A\varphi = F$$

Fig. 5

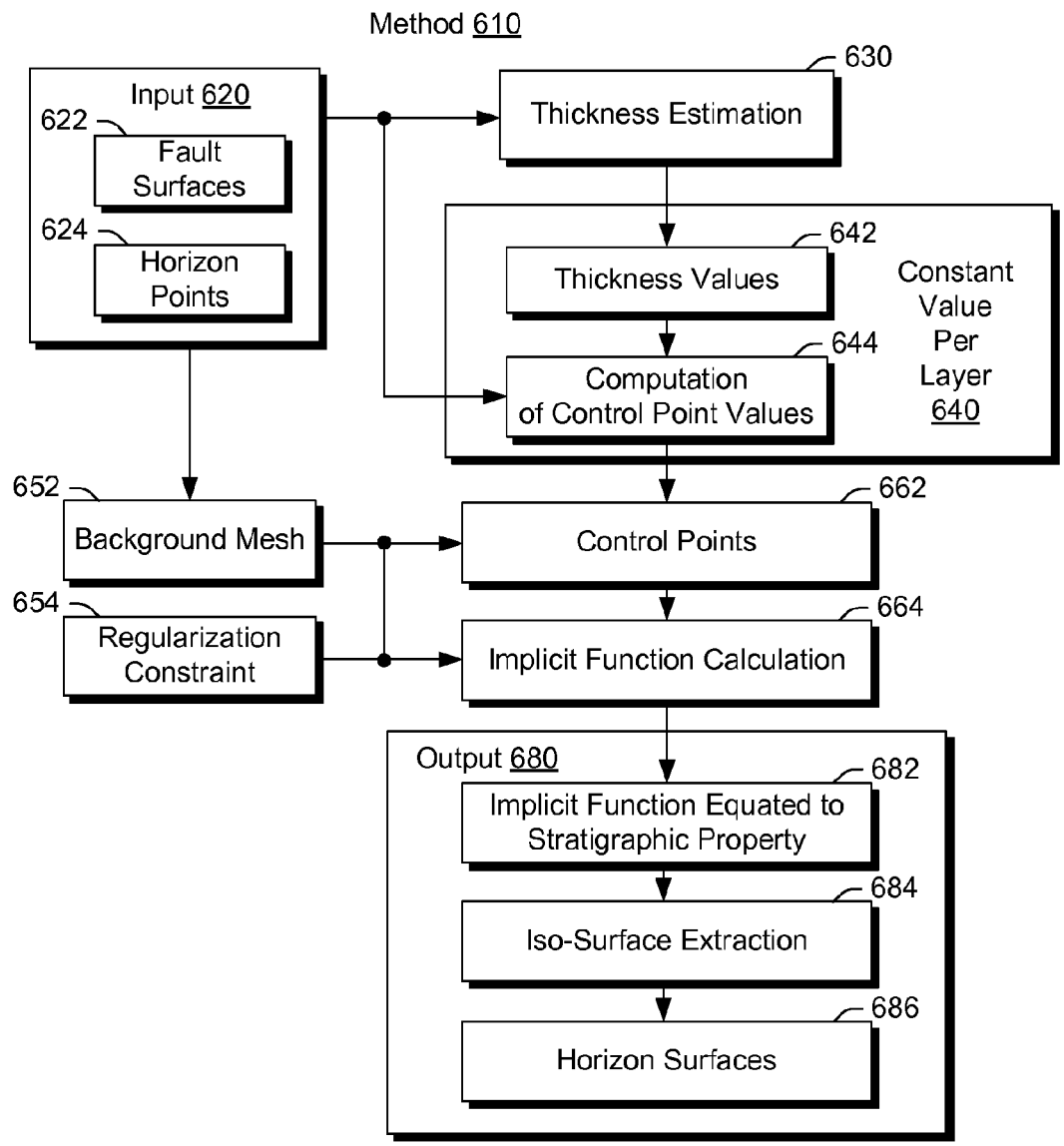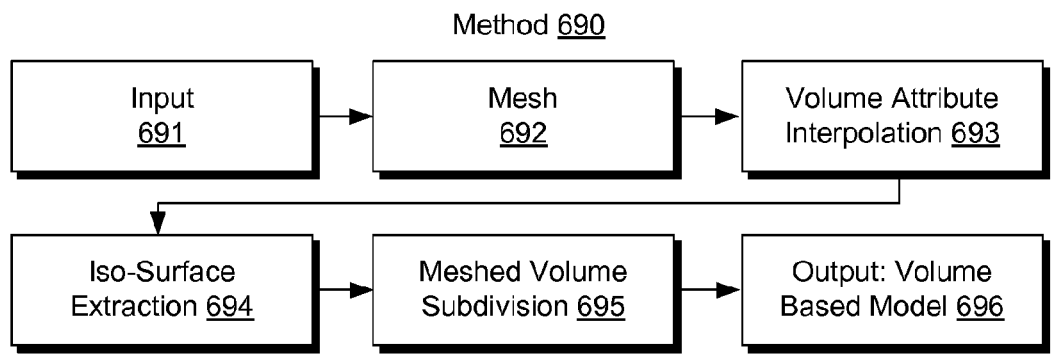
Fig. 6

ASSIGNMENT OF SYSTEMS TRACTS

BACKGROUND

Phenomena associated with a sedimentary basin may be modeled using a mesh, a grid, etc. As an example, a structural model may be created based on data associated with a sedimentary basin. For example, where a basin includes various types of features (e.g., stratigraphic layers, faults, etc.), data associated with such features may be used to create a structural model of the basin. Such a model may be a basis for analysis, further modeling, etc.

SUMMARY

A method can include computing a shelf break for a geologic environment based at least in part on implicit function values associated with the geologic environment; identifying sea level variations with respect to geological time for the shelf break; and assigning at least one systems tract to the geologic environment based at least in part on the sea level variations. A system can include a processor; memory operatively coupled to the processor; and one or more modules that include instructions stored in the memory and executable by the processor to instruct the system where the instructions can include instructions to: compute a shelf break for a geologic environment based at least in part on implicit function values associated with the geologic environment; identify sea level variations with respect to geological time for the shelf break; and assign at least one systems tract to the geologic environment based at least in part on the sea level variations. One or more computer-readable storage media that include computer-executable instructions to instruct a computing device can include instructions to: compute a shelf break for a geologic environment based at least in part on implicit function values associated with the geologic environment; identify sea level variations with respect to geological time for the shelf break; and assign at least one systems tract to the geologic environment based at least in part on the sea level variations. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example system that includes various components for simulating a geological environment;

FIG. 5 illustrates examples of formulations;

FIG. 6 illustrates examples of methods;

DETAILED DESCRIPTION

Figure 2:
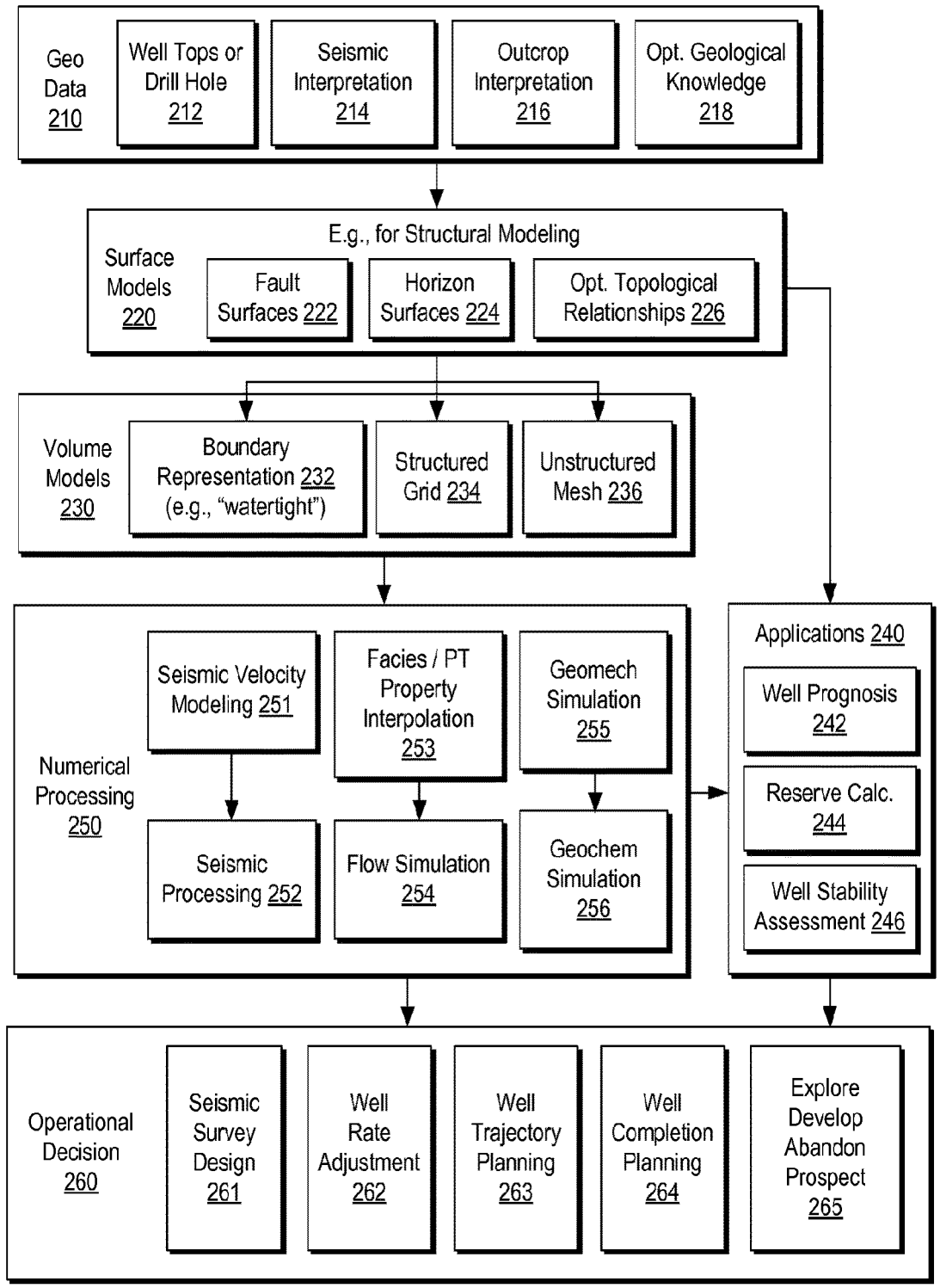
FIG. 2 illustrates an example of a system.

This description is not to be taken in a limiting sense, but rather is made merely for the purpose of describing the general principles of the implementations. The scope of the described implementations should be ascertained with reference to the issued claims.

Phenomena associated with a sedimentary basin (e.g., a subsurface region, whether below a ground surface, water surface, etc.) may be modeled using a model or models. As an example, a structural model of a basin may find use for understanding various processes related to exploration and production of natural resources (estimating reserves in place, drilling wells, forecasting production, etc.). As an example, a structural model may be used as a basis for building a model for use with a numerical technique.

For application of a numerical technique, equations may be discretized using a grid that includes nodes, cells, etc. To represent features in a geologic environment, a structural model may assist with properly locating nodes, cells, etc. of a grid for use in simulation using one or more numerical techniques. As an example, a structural model may itself include a mesh, which may, at times be referred to as a grid. As an example, a structural model may provide for analysis optionally without resorting to creation of a grid suited for discretization of equations for a numerical solver (e.g., consider a structured grid that may reduce computational demands, etc.).

As to numerical techniques, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multi-dimensional "elements". For one spatial dimension, an element may be represented by two nodes positioned along a spatial coordinate. For multiple spatial dimensions, an element may include any number of nodes. Further, some equations may be represented by certain nodes while others are represented by fewer nodes (e.g., consider an example for the Navier-Stokes equations where fewer nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

As mentioned, where a sedimentary basin (e.g., subsurface region) includes various types of features (e.g., stratigraphic layers, faults, etc.) where nodes, cells, etc. of a mesh or grid may represent, or be assigned to, such features. As an example, consider a structural model that may include one or more meshes. Such a model may serve as a basis for formation of a grid for discretized equations to represent a sedimentary basin and its features.

As to a stratigraphic sequence, a sedimentary basin may include sedimentary deposits grouped into stratigraphic units, for example, based on any of a variety of factors, to approximate or represent time lines that place stratigraphy in a chronostratigraphic framework. While sequence stratigraphy is mentioned, lithostratigraphy may be applied, for example, based on similarity of lithology of rock units (e.g., rather than time-related factors).

As an example, a mesh may conform to structural features such as, for example, Y-faults, X-faults, low-angle unconformities, salt bodies, intrusions, etc. (e.g., geological discontinuities), to more fully capture complexity of a geological model. As an example, a mesh may optionally conform to stratigraphy (e.g., in addition to one or more geological discontinuities). As to geological discontinuities, these may include model discontinuities such as one or more model boundaries. As an example, a mesh may be populated with property fields generated, for example, by geostatistical methods.

In general, a relationship may exist between node spacing and phenomenon or phenomena being modeled. Various scales may exist within a geologic environment, for example, a molecular scale may be on the order of approximately $10^{-9}$ to approximately $10^{-8}$ meters, a pore scale may be on the order of approximately $10^{-6}$ to approximately $10^{-3}$ meters, bulk continuum may be on the order of approximately $10^{-3}$ to approximately $10^{-2}$ meters, and a basin scale on the order of approximately $10^3$ to approximately $10^5$ meters. As an example, nodes of a mesh may be selected based at least in part on the type of phenomenon or phenomena being modeled (e.g., to select nodes of appropriate spacing or spacings). As an example, nodes of a grid may include node-to-node spacing of about 10 meters to about 500 meters. In such an example, a basin being modeled may span, for example, over approximately $10^3$ meters. As an example, node-to-node space may vary, for example, being smaller or larger than the aforementioned spacings.

Some data may be involved in building an initial mesh and, thereafter, a model, a corresponding mesh, etc. may optionally be updated in response to model output, changes in time, physical phenomena, additional data, etc. Data may include one or more of the following: depth or thickness maps and fault geometries and timing from seismic, remote-sensing, electromagnetic, gravity, outcrop and well log data. Furthermore, data may include depth and thickness maps stemming from facies variations.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

As an example, reservoir simulation, petroleum systems modeling, etc. may be applied to characterize various types of subsurface environments, including environments such as those of FIG. 1.

As an example, a sedimentary basin, as a geologic environment, can include horizons, faults, one or more geobodies and facies formed over some period of geologic time. These features can be distributed in two or three dimensions in space, for example, with respect to a Cartesian coordinate system (e.g., x, y and z) or other coordinate system (e.g., cylindrical, spherical, etc.). As an example, a model building method can include a data acquisition block for acquiring data (e.g., receiving data) and a model geometry block (e.g., for modeling geometry based at least in part on data). As an example, some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Further, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, the OCEAN® framework, etc., workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As an example, a method may include structural modeling, for example, building a structural model, editing a structural model, etc. of a geologic environment. As an example, a workflow may include providing a structural model prior to construction of a grid (e.g., using the structural model), which may, in turn, be suitable for use with one or more numerical techniques. As an example, one or more applications may operate on a structural model (e.g., input of a structural model).

FIG. 2 shows an example of a system 200 that includes a geological/geophysical data block 210, a surface models block 220 (e.g., for one or more structural models), a volume models block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

Figure 3:
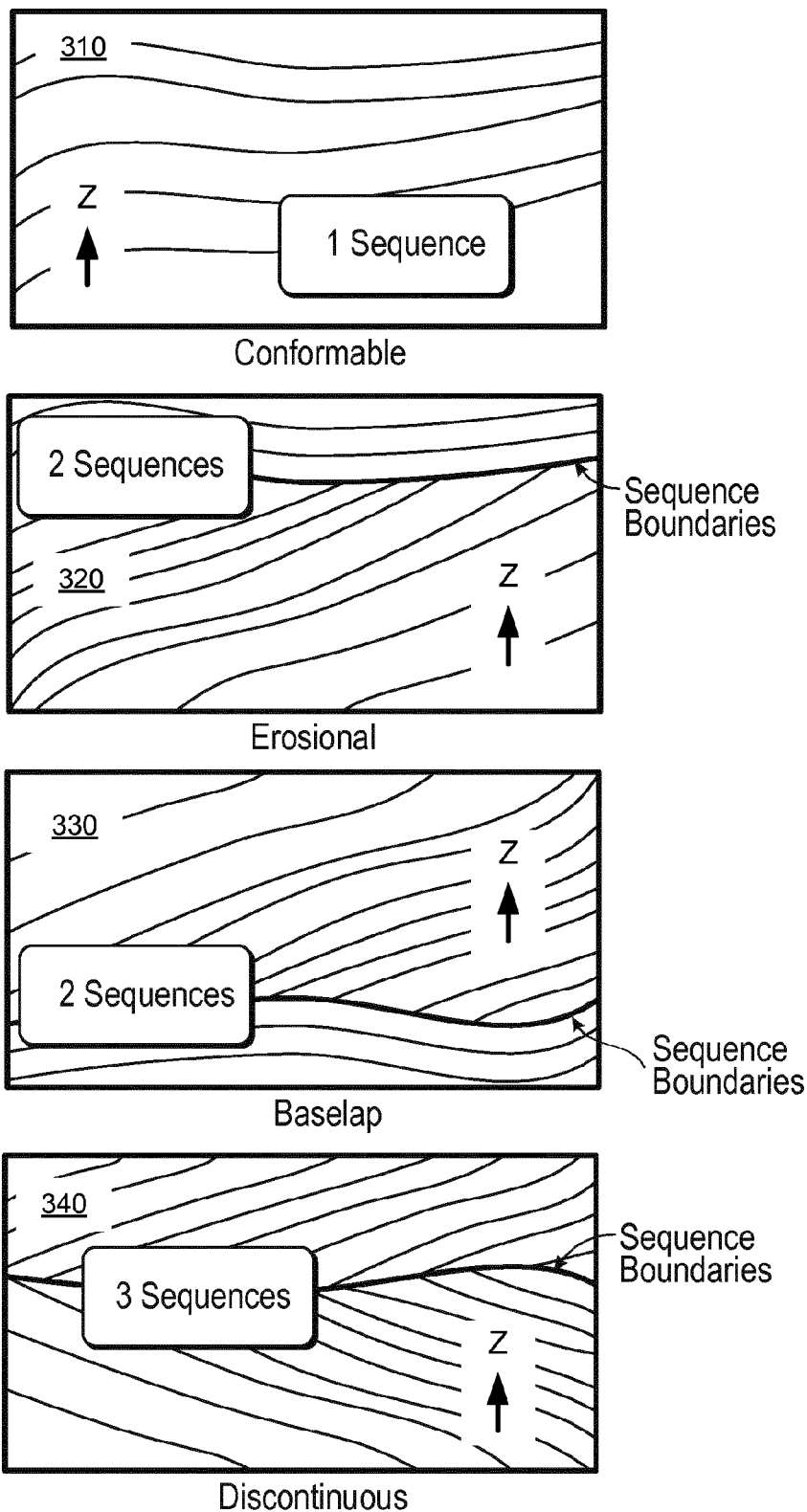
FIG. 3 illustrates examples of conformities and unconformities.

FIG. 3 shows examples of formations that include one or more sequences, for example, sequences of sedimentary structures (e.g., strata, horizons, etc.) occurring in sedimentary rocks. As shown in FIG. 3, the formation 310 includes a single sequence, the formations 320 and 330 each include two sequences and the formation 340 includes three sequences, the middle sequence being collapsed into a single discontinuity surface.

As an example, a conformable horizon may be a horizon between a lower horizon and an upper horizon where the horizons have undergone a relatively common geologic history, for example, being deposited in succession (e.g., continuous in time). Referring to the formation 310, the horizons do not intersect one another and each of the horizons may be considered conformable to adjacent horizons (e.g., lower and upper or older and younger).

As an example, erosion may act to denude rock, for example, as a result of physical, chemical and/or biological breakdown and/or transportation. Erosion may occur, for example, as material (e.g., weathered from rock, etc.) is transported by fluids, solids (e.g., wind, water or ice) or mass-wasting (e.g., as in rock falls and landslides). Referring to the formation 320, of the two sequences shown, the lower sequence may have been eroded and the upper sequence deposited on top of the eroded lower sequence. In such an example, the boundary between the two sequences may be referred to as an erosion; noting that it is conformable to the upper, younger sequence. As an example, erosion may act to "truncate" a sequence of horizons and to form surface upon which subsequent material may be deposited (e.g., optionally in a conformable manner).

As an example, a baselap may be a type of feature in a formation, for example, such as a downlap or an onlap. As an example, a downlap may be a termination of more steeply dipping overlying strata against a surface or underlying strata that have lower apparent dips. For example, a downlap may be seen at the base of prograding clinoforms and may represent progradation of a basin margin. As to an onlap, for example, it may be a termination of shallowly dipping, younger strata against more steeply dipping, older strata (e.g., sequence stratigraphy that may occur during periods of transgression). Referring to the formation 230, given the indicated direction "z" as depth, the type of baselap shown may be considered as a downlap (e.g., lower strata having lower apparent dips). In such an example, the baselap boundary is conformable to immediately older horizons (lower sequence).

As to the formation 340, it includes three sequences and may be referred to as a discontinuity as the boundary is neither conformable to older horizons nor to younger ones. In the examples of FIG. 3, erosions, baselaps and discontinuities may be referred to as unconformities or non-conformable horizons (e.g., or surfaces, layers, etc.).

Figure 4:
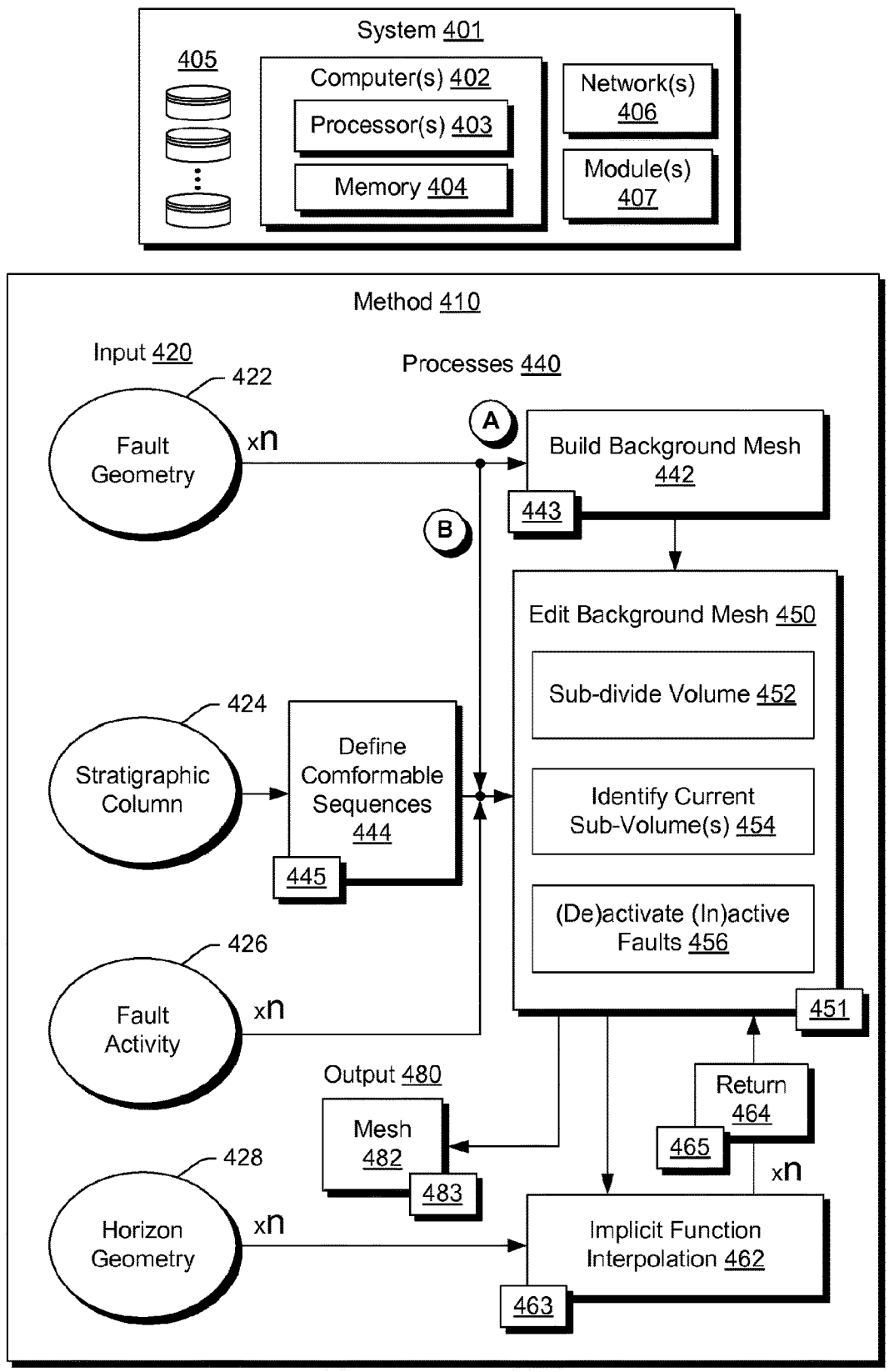
FIG. 4 illustrates an example of a system and an example of a method.

FIG. 4 shows an example of a system 401 and a method 410. As shown in FIG. 4, the system 401 includes one or more computers 402, one or more storage devices 405, one or more networks 406 and one or more modules 407. As to the one or more computers 402, each computer may include one or more processors (e.g., or processing cores) 403 and memory 404 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 405 where the computer(s) 402 may access the data via the network(s) 406 and process the data via the module(s) 407, for example, as stored in the memory 404 and executed by the processor(s) 403.

As an example, a system may include receiving information. For example, a component of a system may include receiving information via a bus, a storage device, a network interface, etc. As an example, where instructions execute via a processor, the processor may receive information. For example, a processor may receive data. As an example, data may correspond to measured data, synthetic data, constructed data, etc. As an example, data may be attribute data. As an example, data may describe a model. As an example, data may describe a mesh. As an example, data may define an implicit function. As an example, data may define a stratigraphic function. As an example, a processor may provide information by receiving the information, by generating the information, etc.

As shown in FIG. 4, the method 410 includes input 420, processes 440 and output 480. As to the input 420, the method 410 may receive, for example, fault geometry input per an input block 422, stratigraphic column input per an input block 424, fault activity input per an input block 426 and horizon geometry input per an input block 428. As indicated, the processes 440 can include a build block 442 for building a background mesh, a definition block 444 for defining conformable sequences, an edit block 450 for performing one or more edit procedures per blocks 452, 454 and 456, an implicit function interpolation block 462 for interpolating an implicit function (e.g., or implicit functions) and a return block 464, which may return to the edit block 450, for example, after performing one or more interpolations per the implicit function interpolation block 462. As an example, the method 410 can include outputting a mesh as output 480 per a mesh output block 482, for example, where the output mesh may be suitable for one or more purposes.

As an example, the method 410 may include receiving a background mesh (e.g., built per the mesh block 442), receiving one or more conformable sequences (e.g., defined per the definition block 444) and editing the received background mesh using the received one or more conformable sequences (e.g., per the edit block 450) to provide an edited mesh. In such an example, the method 410 may include populating the edited mesh with values of an implicit function via an interpolation procedure (e.g., per the implicit function interpolation block 462) based at least in part on receiving, as input, horizon geometry (e.g., per the input block 428). In such an example, the method 410 may include outputting a mesh that is or may be "split" into multiple volumes along one or more unconformities (see, e.g., the formations 320, 330 and 340 of FIG. 3). For example, the method 410 may include outputting a mesh (e.g., per the mesh output block 482). In turn, a model of a geologic environment may be constructed at least in part using such a mesh.

As an example, a method may be implemented that can create a model (e.g., a multidimensional spatial model) of a faulted stratigraphic sequence (e.g., faulted geological layers). Such a method may include creating a model that represents one or more unconformities, for example, where an unconformity may be a domain boundary that separates younger rock from older rock (e.g., consider a gap in a geological time record). As an example, a method may create a model for use in modeling structures, phenomena, etc. in one or more dimensions. As an example, a model may be suited for modeling structures, phenomena, etc. with respect to time (e.g., a time dimension, whether forward, backward or both). As an example, a method that includes performing one or more numerical techniques may use a model, for example, to discretize a geologic environment (e.g., in one or more dimensions) and to formulate sets of equations that correspond to at least a portion of the discretized geologic environment. For example, a model may include nodes, a grid defined by nodes, cells (e.g., consider two-dimensional cells and three-dimensional cells), etc.

As an example, a method such as the method 410 may account for real geometrical input, for example, without necessarily having to model or interpret eroded or non-deposited parts of layers, or eroded parts of faults. As an example, a method may include constructing a geological model in the form of a mesh or of a set of meshes, such that the model is watertight, for example, where one or more faults, conformable layers and unconformities may be represented by meshes (e.g., optionally resulting from splitting of a mesh) that have contacts (i.e. no geometrical gaps or overlaps) with each other. As an example, a method may include accounting for fault activity, for example, where faults may be eroded by some conformable sequences while introducing a discontinuity in younger sequences, in a geologically consistent manner. As an example, a method may be tolerant to geometrical inaccuracies in the interpretation of such eroded faults, and may produce geologically meaningful results even if the fault interpretation is going past the erosion surface that should be truncating it.

As an example, a method may include modeling simultaneously (e.g., representing by a single implicit function on a volume mesh), horizons that belong to a particular conformal sequence (e.g., including one or more sequence boundaries where one or more may be an unconformity). For example, referring to the example formations 320, 330 and 340 of FIG. 3, a method may include modeling successively each of the conformable sequences subject to a sequence boundary (e.g., or boundaries) that may be an unconformity (e.g., an erosion, a baselap, a discontinuity, etc.), for example, by representing conformal sequences by one or several implicit functions defined on separate (e.g., topologically disconnected) elements of a background mesh. Such an approach may provide for reliable and accurate modeling of conformable or non-conformable horizons, for example, which may at times be defined by sparse data (e.g., consider well tops data).

Referring again to the method 410 of FIG. 4, examples of Options A and B are shown with respect to the fault geometry input block 422. For Option A, the input block 422 may provide input to the build block 442 for use in building a background mesh; whereas, for Option B, the fault geometry input block 422 may provide input to the edit block 450. For Option A, as an example, a background mesh may be built by the build block 442 such that the background mesh is constrained, at least in part, by geometry of a fault or faults. For Option B, as an example, a background mesh may be unconstrained by geometry of a fault or faults while editing per the edit block 450 takes into account geometry of a fault or faults.

The method 410 of FIG. 4 may be referred to as an implicit modeling technique as it includes using one or more implicit functions. As an example, such a method can include representing geological horizons in three-dimensions using specific iso-surfaces of a scalar property field (e.g., an implicit function) defined on a three-dimensional background mesh. In such an example, continuity of the scalar field property may be governed by continuity of the background mesh.

As an example, a method can include building a background mesh suitable for interpolating an implicit function, identifying a set of conformable sequences from the geological type of stratigraphic horizons, and editing the background mesh on which the interpolation is performed for processing of a first conformable sequence or between processing of two successive conformable sequences. As to such editing, it may include creating sub-volumes in the background mesh by subdividing it by previously interpolated sequence boundaries (see, e.g., the subdivision block 452 of FIG. 4), identifying sub-volumes corresponding to a "current" conformable sequence (see, e.g., the identification block 454 of FIG. 4) and restricting further interpolation and iso-surface extraction processes to the identified sub-volumes and, for example, managing fault activity in one or more of the identified sub-volumes (see, e.g., the (de) activate (in)activate block 456 of FIG. 4), for example, by introducing and/or removing one or more internal discontinuities in the background mesh.

Figure 7:
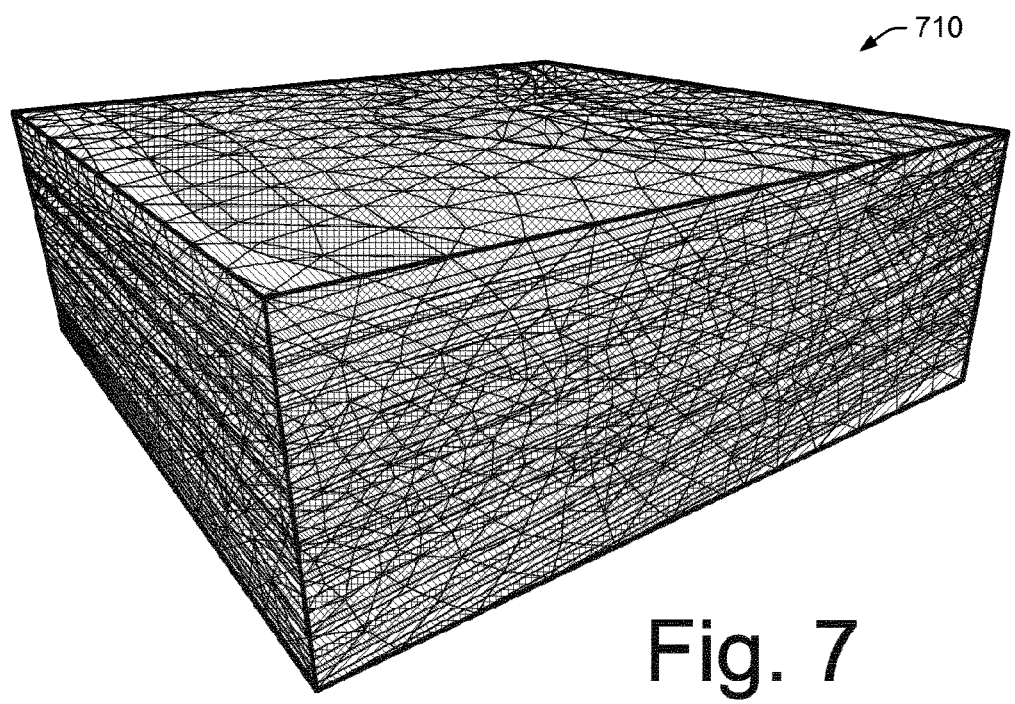
FIG. 7 illustrates an example of a mesh in a volume of interest.
Figure 8:
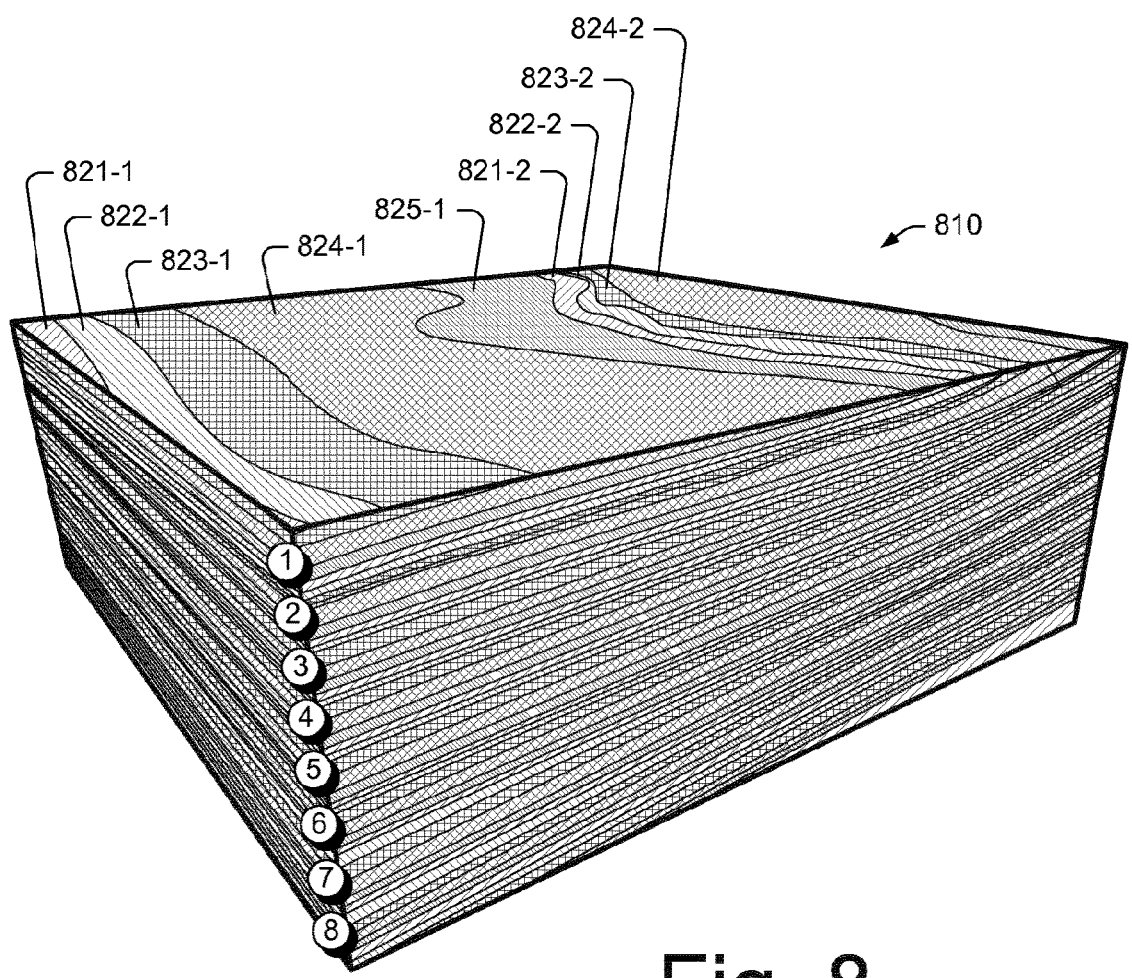
FIG. 8 illustrates an example of volume attribute values in a volume of interest.

As to processing one or more implicit functions, a method can include interpolating one or more implicit functions on a "conformable sequence per conformable sequence" basis, for example, optionally one conformable sequence at a time (see, e.g., the example meshes of FIGS. 7 and 8).

In the example of FIG. 4, the method 410 includes a return block 464 whereby results from the implicit function interpolation block 462 may be provided to the edit block 450 to perform one or more additional edits to the edited background mesh. As an example, a loop may exist between the edit block 450 and the implicit function interpolation block 462, for example, where various actions may be repeated to process a stratigraphic pile (e.g., for modeling the stratigraphic pile). As an example, an iso-value of a previously interpolated implicit function that corresponds to an unconformity (e.g., a sequence boundary) may be used as input to sub-divide block 452, As mentioned, the method 410 can include output 480, for example, which may output a mesh (e.g., or meshes) per the mesh output block 482. As an example, a mesh (e.g., or meshes) may be considered a model of a geologic environment.

The method 410 is shown in FIG. 4 in association with various computer-readable media (CRM) blocks 443, 445, 451, 463, 465 and 483. Such blocks generally include instructions suitable for execution by one or more processors (or cores) to instruct a computing device or system to perform one or more actions. While various blocks are shown, a single medium may be configured with instructions to allow for, at least in part, performance of various actions of the method 410. As an example, a computer-readable medium (CRM) may be a computer-readable storage medium. As an example, the blocks 443, 445, 451, 463, 465 and 483 may be provided as one or more modules, for example, such as the one or more modules 407 of the system 401 of FIG. 4.

FIG. 5 shows an example of a control point constraints formulation 510 with respect to a tetrahedral cell 512 (e.g., a volumetric element) that includes a control point 514 and an example of a linear system formulation 530. As an example, an implicit function may be a scalar field. As an example, an implicit function may be represented as a property or an attribute, for example, for a volume (e.g., a volume of interest). As an example, the aforementioned PETREL® framework may include a volume attribute that includes spatially defined values that represent values of an implicit function.

As an example, a function "F" may be defined for coordinates (x, y, z) and equated with an implicit function denoted φ. As to constraint values, the function F may be such that each input horizon surface "I" corresponds to a known constant value $h_i$ of φ. For example, FIG. 5 shows nodes (e.g., vertices) of the cell 512 as including $a_0$, $a_1$, $a_2$ and $a_3$ as well as corresponding values of φ (see column vector). As to the values $h_i$ of φ, if a horizon I is younger than horizon J, then $h_i > h_j$ and, if one denotes $T\_ij^*$ as an average thickness between horizons I and J, then $(h_k - h_i)/(h_j - h_i)$ ~ $T\_ik^*/Tij^*$, for which a method can include estimating values of $T\_ij^*$ before an interpolation is performed. Note that the method may accept lower values $h_i$ of φ for younger horizons, for example, a constraint being that, within each conformal sequence, the values $h_i$ of φ vary monotonously with respect to the age of the horizons. As an example, this may be a single constraint.

As to interpolation of "F", as an example, φ may be interpolated on nodes of a background mesh (e.g., a triangulated surface in 2D, a tetrahedral mesh in 3D, a regular structured grid, quad/octrees, etc.) according to several constraints that may be honored in a least squares sense. In such an example, as the background mesh may be discontinuous along faults, interpolation may be discontinuous as well; noting that "regularization constraints" may be included, for example, for constraining smoothness of interpolated values.

As an example, a method can include interpolating an implicit function on a vertical (2D) cross-section through a model where, for example, the interpolating includes constraining the interpolation by dip information. For example, consider a method that includes constraining an interpolation by apparent dip of one or more horizons of a section (e.g., seismic horizons of a 2D cross-section).

As an example, a method may include using fuzzy control point constraints. For example, consider a location of interpretation points, $h_i$ of φ (see, e.g. point a* in FIG. 5). As an example, an interpretation point may be located at a location other than that of a node of a mesh onto which an interpolation is performed, for example, as a numerical constraint may be expressed as a linear combination of values of φ at nodes of a mesh element (e.g. a tetrahedron, tetrahedral cell, etc.) that includes the interpretation point (e.g., coefficients of a sum being barycentric coordinates of the interpretation point within the element or cell).

For example, for an interpretation point p of a horizon I located inside a tetrahedron which includes vertices are $a_0$, $a_1$, $a_2$ and $a_3$ and which barycentric coordinates are $b_0$, $b_1$, $b_2$ and $b_3$ (e.g., such that the sum of the barycentric coordinates is approximately equal to 1) in the tetrahedron, an equation may be formulated as follows:

$$b_0\varphi(a_0)+b_1\varphi(a_1)+b_2\varphi(a_2)+b_3\varphi(a_3)=h_i$$

where unknowns in the equation are $\varphi(a_0)$, $\varphi(a_1)$, $\varphi(a_2)$ and $\varphi(a_3)$. For example, refer to the control point $\varphi(a^*)$, labeled 514 in the cell 512 of the control point constraints formulation 510 of FIG. 5, with corresponding coordinates (x*, y*, z*); noting a matrix "M" for coordinates of the nodes or vertices for $a_0$, $a_1$, $a_2$ and $a_3$, (e.g., $x_0$, $y_0$, $z_0$ to $x_3$, $y_3$, $z_3$).

As an example, the number of such constraints of the foregoing type may be based on the number of interpretation points where, for example, interpretation points may be decimated interpretation for improving performance.

As mentioned, a process can include various regularization constraints, for example, for constraining smoothness of interpolated values, of various orders (e.g., constraining smoothness of φ or of its gradient ∇φ), which may be combined through a weighted least squares scheme.

As an example, a method can include constraining the gradient ∇φ in a mesh element (e.g. a tetrahedron, a tetrahedral cell, etc.) to take a (weighted) arithmetic average of values of the gradients of φ with respect to its (topological) neighbors. As an example, one or more weighting schemes may be applied (e.g. by volume of an element) and one or more definitions of a topological neighborhood (e.g., by face adjacency) may be considered. As an example, two geometrically "touching" mesh elements that are located on different sides of a fault may be deemed not topological neighbors, for example, as a mesh may be "unsewn" along fault surfaces (e.g., to define a set of elements or a mesh on one side of the fault and another set of elements or a mesh on the other side of the fault).

As an example, within a mesh, if one considers a mesh element $m_i$ that has n neighbors $m_j$ (e.g., for a tetrahedron), one may formulate an equation of the regularization constraint as follows:

$$\nabla \varphi(m_i) = \frac{1}{n}\sum_{j=1}^{n} \nabla \varphi(m_j)$$

In such an example of a regularization constraint, where solutions for which iso-values of the implicit function would form a "flat layer cake" or "nesting balls" geometries may be considered "perfectly smooth" (i.e. not violating the regularization constraint), it may be that a first one is targeted.

As an example, one or more constraints may be incorporated into a system in linear form. For example, hard constraints may be provided on nodes of a mesh (e.g., a control node). In such an example, data may be from force values at the location of well tops. As an example, a control gradient, or control gradient orientation, approach may be implemented to impose dip constraints.

Referring again to FIG. 5, the example linear system formulation 530 includes various types of constraints. For example, a formulation may include harmonic equation constraints, control point equation constraints (see, e.g., the control point constraints formulation 510), gradient equation constraints, constant gradient equation constraints, etc. As shown in FIG. 5, a matrix A may include a column for each node and a row for each constraint. Such a matrix may be multiplied by a column vector such as the column vector $\varphi(a_i)$ (e.g., or φ), for example, where the index "i" corresponds to a number of nodes, vertices, etc. for a mesh (e.g., a double index may be used, for example, $a_{ij}$, where j represents an element or cell index). As shown in the example of FIG. 5, the product of A and the vector φ may be equated to a column vector F (e.g., including non-zero entries where appropriate, for example, consider $\phi_{control\,point}$ and $\phi_{gradient}$.

FIG. 6 shows a block diagram of an example of a method 610 that includes an input block 620 and output block 680, for example, to output an implicit function equated to a stratigraphic property per a block 682. As to the input block 620, it may include a fault surfaces input block 622 and a horizon points input block 624. As shown in the example of FIG. 6, the input block 620 may provide input to a thickness estimation block 630, a layer block 640 and a background mesh block 652.

As to the layer block 640, it can include a thickness values block 642 for determining or receiving thickness values (e.g., based on or from the thickness estimation block 630) and a computation block 644 for computing control point values (see, e.g., the formulations 510 and 530 of FIG. 5). As shown, the layer block 640 can output control points to a control points block 662, which may be defined with respect to a mesh provided by the background mesh block 652. As an example, the control points of the control points block 662 may account for one or more regularization constraints per a regularization constraint block 654.

As an example, given control point values for layers definable with respect to a mesh and subject to one or more constraints, a method can include calculating values of an implicit function (e.g., or implicit functions). As shown in the example of FIG. 6, an implicit function calculation block 662 can receive control points and one or more constraints defined with respect to a mesh (e.g., elements, cells, nodes, vertices, etc.) and, in turn, calculate values for one or more implicit functions.

As to the output block 680, given calculated values for one or more implicit functions, these may be associated with, for example, a stratigraphic property per the block 682. As an example, one or more iso-surfaces may be extracted based at least in part on the values of the stratigraphic property per an iso-surface extraction block 684, for example, where one or more of the extracted iso-surfaces may be defined to be a horizon surface (e.g., or horizon surfaces) per a horizon surface block 686.

FIG. 6 also shows an example of a method 690 for outputting a volume based model (e.g., a model constructed from a subdivision of a volume of interest in sub-volumes representing stratigraphic layers, fault blocks or segments, etc.). As shown, the method 690 includes an input block 691 for inputting information (e.g., sealed fault framework information, horizon interpretation information, etc.), a mesh block 692 for providing or constructing a mesh, a volume attribute interpolation block 693 for interpolating values (e.g., using one or more implicit functions), an iso-surface extraction block 694 for extracting one or more iso-surfaces (e.g., based at least in part on the interpolated values), a subdivision block 695 for subdividing a meshed volume (e.g., based at least in part on one or more of the one or more extracted iso-surfaces) and an output block 696 for outputting a volume based model (e.g., based at least in part on one or more portions of a subdivided meshed volume).

As an example, the input block 691 may include one or more features of the input block 620 of the method 610, the mesh block 692 may include one or more features of the mesh block 652 of the method 610, the volume attribute interpolation block 693 may include one or more features of the implicit function calculation block 664 and/or the stratigraphic property block 682 of the method 610, the iso-surface extraction block 694 may include one or more features of the iso-surface extraction block 684 of the method 610, the subdivision block 695 may include subdividing a meshed volume using one or more horizon surfaces per the horizon surfaces block 686 of the method 610 and the output block 696 may include outputting a volume based model based at least in part on one or more outputs of the output block 680 of the method 610.

As explained with respect to the method 410 of FIG. 4, an implicit function may be provided for performing, for example, interpolation. As an example, an implicit modeling approach can include representing surfaces as iso-values of a volume attribute (e.g., of an implicit function). As an example, such a volume attribute may be referred to as being a "thickness proportion" (e.g., volumetrically filling in space). For example, an implicit function may correspond to the stratigraphic age of formations and, for example, such an implicit function may be embedded and interpolated in a volumetrically filling tetrahedral mesh (e.g., structured, unstructured, etc.).

As an example, a method can include building a tetrahedral mesh for carrying and interpolating an implicit function. As an example, a 3D boundary-constrained Delaunay mesh generator may be implemented, for example, with constraints such as constraints based on faults affecting considered horizons where such faults may be accounted for as internal boundaries during mesh generation, for example, where some border faces of tetrahedra may match fault geometries in a resulting mesh. As an implicit function may be defined and interpolated on nodes of a tetrahedral mesh, density of the mesh, and therefore the spatial resolution of the implicit function, may be controlled, for example, to include a higher density within a shell at, proximate to or around various data and/or faults (e.g., to maximize degree of freedom of an interpolation at or near various data and/or faults). As an example, a mesh adaptation process may include producing tetrahedra that have a vertical resolution higher than their areal resolution (e.g., to better capture thickness variations in layering). As an example, a resulting mesh (e.g., a built mesh) may be unstructured.

As an example, a method can include interpolating values of an implicit function on nodes of a tetrahedral mesh. As an example, an interpolation process may include using a linear least squares formulation, which may tend to minimize misfit between interpretation data and interpolated surfaces and to minimize variations of dip and thickness of layers.

As an example, a method can include generating surfaces representing individual implicitly modeled horizons. In such an example, as the specific value of the implicit function associated to each of the individual horizons may be known, a method may include using an iso-surfacing algorithm. As an example, resolution of a resulting surface or surfaces may be higher or approximately equal to a local resolution of a tetrahedral mesh around sample points (e.g., which may be user-controllable).

As an example, a method may include a volume based modeling approach that generates a consistent zone model (e.g., a model of interpreted geological layers). For example, such a zone model may include an individual geological layer that may be seen as an interval of values of an implicit function. In such an example, given its value of the implicit function, a method may determine to which layer an arbitrary point belongs, in particular where such arbitrary points correspond to nodes of a mesh supporting the implicit function.

As an example, edges of a tetrahedral mesh may intersect limits of geological layers. In such an example, construction of such intersection points may have been computed where they correspond to nodes of triangulated surfaces representing horizons. Accordingly, zones may be built by cutting edges of the tetrahedral mesh by some iso-surfaces of the implicit function.

As an example, a method can include cutting a volume to produce zones that are sets of tetrahedra. As an example, a method can include cutting volume borders to produce zones that are sets of triangulated patches. As to the latter, it may include cutting volume borders by iso-contours. As noted, one or more implicit functions may be formulated for determination of iso-surfaces and/or iso-contours that do not intersect one another other.

As an example, a volume based modeling approach may be less sensitive to complexity of a fault network and may provide conformable horizons belonging to a common conformable sequence (e.g., which may be modeled simultaneously). As to the latter, by using an implicit approach (e.g., by representing sets of conformable horizons by several iso-values of a common implicit attribute), the approach may avoid crossing of conformable horizons.

As an example, a volume based modeling approach may provide for conformable horizons that constrain geometry of other conformable horizons that belong to a common sequence, which itself may be constrained by geometry. As an example, a volume based modeling approach may be applied in scenarios where data are sparse, for example, consider data from well tops, 2D sections, etc. As an example, one or more surfaces may be modeled using seismic data and, for example, globally adjusted using well top data.

As an example, a volume based modeling approach may include outputting geometry of a horizon as well as volume attribute values, which may be defined within a volume of interest and, for example, represent a stratigraphic age, or relative chronostratigraphic age, of a formation (or formations).

As an example, the method 410 of FIG. 4 may include outputting one or more models (e.g., a mesh or meshes, etc.) that account for various features of a geologic environment, for example, where the output model or models is volume filling (e.g., "watertight" or "sealed").

As an example, a method may be implemented to create a reservoir model on a "conformable sequence per conformable sequence" basis, for example, where surfaces belonging to a common conformable sequence may be interpolated simultaneously. As an example, a method can include iteratively editing topology of a volume mesh, for example, to control extent of the volume in which an interpolation is performed and continuity of an interpolated implicit function. As an example, a method may include producing layering that is consistent with a geological style of deposition in one or more eroded areas.

As an example, a method can include building a background mesh, for example, where the background volume mesh covers a volume of interest (VOI), which itself may be of a size sufficient to include horizons to be modeled.

FIG. 7 shows an example of a mesh 710 that may be volumetrically filled by, for example, tetrahedra. In the example of FIG. 7, the mesh 710 is also shown along with volume attribute values. In the example of FIG. 7, the volume attribute values may be displayed or represented with respect to a periodic color scale, for example, where the volume attribute or "property" may be monotonously increasing (e.g., corresponding to values of a monotonic implicit function). For example, each "period" of the periodic scale may correspond to a layer in a series of layers defined by input horizons. In such an example, an individual horizon may be conformable to another individual horizon within a common sequence.

FIG. 8 shows a volume 810 that corresponds to the mesh 710 of FIG. 7, however, without lines indicating mesh elements (e.g., mesh cells, etc.). In the example of FIG. 8, eight portions (portions 1 to 8) are shown as an example for purposes of explanation. For example, within these portions, a periodic scale may be repeated as indicated by black and white hatchings: 821-1, 822-1, 823-1, 824-1, 825-1, 821-2, 822-2, 822-3, 824-2, etc. As mentioned, the scale may represent values of an implicit function. As an example, a scale may be illustrated using one or more colors, shading, rainbow patterns, etc.

Referring again to FIG. 7, the tetrahedral background mesh 710 also shows an implicit function represented by a periodic scale (e.g., whether black and white, color, etc.) that may be interpolated within the background mesh. As mentioned, FIG. 8 shows the volume 810 without the mesh lines to more clearly illustrate an example of a periodic scale for an implicit function.

As an example, a method may include building a mesh that includes subsets of its facets that match (e.g., in a general sense) elements of the mesh representing one or more faults. In such an example, the facets may be approximating, in the background mesh, geometry of a fault network. As an example, a mesh may include elements with shape and size that are specified to be suitable for an interpolation process (e.g., shape, size, etc. may be specified depending on one or more characteristics of an interpolation process).

As an example, a mesh may be considered an initial mesh (e.g., or other early stage mesh) that may not include one or more internal borders, for example, that represent one or more discontinuities.

As an example, a method can include identifying one or more conformable sequences. In such an example, an identification process may include identifying a set of conformable sequences from a geological type of stratigraphic horizons, for example, provided by an operator of the system. As an example, consider one or more of the definitions provided with respect to FIG. 3 where: (a) an erosion may be an unconformity that is conformable to one or more horizons immediately younger (e.g., without gaps in the geological record) and not conformable to one or more older horizons; (b) a baselap may be an unconformity that is conformable to one or more horizons immediately older (e.g., without gaps in the geological record) and not conformable to one or more younger horizons; and (c) a discontinuity may be an unconformity that is neither conformable to one or more older horizons nor to one or more younger ones. As an example, a conformable horizon may be assumed to be conformable to at least an adjacent younger horizon and at least an adjacent older horizon.

Provided with definitions for a given stratigraphic sequence that includes conformable horizons and unconformities, it may be possible to divide the sequence into subsets of conformable sequences, for example, where an individual horizon (e.g., conformable or unconformity) belongs to a single conformable sequence. For example, consider the following rules: (a) an erosion is the oldest horizon to be modeled in the conformable sequence it belongs to; (b) a baselap is the youngest horizon to be modeled in the conformable sequence it belongs to; and (c) a discontinuity is modeled alone in its "own" conformable sequence, which may be, in such a case, a conformable sequence that is degenerated to a single surface.

Through use of such rules, a produced conformable sequence may include a set of horizons that are conformable to one another, for example, meaning that they do not have any contact with one another and do not intersect one another. In such an example, an individual conformable sequence may be modeled with a single implicit function. As an example, a one-to-one correspondence may exist between conformable sequences and implicit functions.

As an example, a method can include editing a mesh (e.g., a background mesh). For example, an editing process may prepare a mesh for interpolation of an implicit function for modeling a given conformable sequence in the mesh. As an example, consider a sub-volume process that can create sub-volumes within a meshed volume of interest (VOI). As an example, sub-volumes may be first created from sub-volumes of a background mesh used to model a prior conformable sequence; noting that where a conformable sequence is a first conformable sequence, such a process may, by definition, not have a prior conformable sequence and may be created directly. As an example, a sub-volume process may include cutting sub-volumes according to one or more unconformities that may bound a conformable sequence previously modeled.

A sub-volume process may be performed, for example, in a manner that avoids numerical instabilities where a feature may be an iso-surface of a scalar property field defined within considered sub-volumes. In such an example, geometrical intersections between mesh elements of the feature (e.g., which may be triangles or other shaped faces) and the mesh elements of the sub-volumes (e.g., which may be tetrahedra or other volumes), may be, for example, one of two kinds: (i) a node of a triangle lying on an edge of a tetrahedron; or (ii) a node of a triangle being collocated with a node of a tetrahedron. Such an approach may, for example, facilitate computation of one or more geometrical intersections.

As an example, an identification process may include identifying one or more sub-volumes as corresponding to a conformable sequence. For example, where a previously modeled unconformity is modeled through a volume of interest and includes a maximum areal extension, it may intersect the volume of interest in a manner that divides the volume of interest into sub-volumes such as, for example, two subsets of new sub-volumes. As an example, one subset of new sub-volumes may be for a sequence older than an unconformity while another subset of new sub-volumes may be for a sequence younger than the unconformity.

As an example, a method may include computing relative ages by taking an average value of an implicit function having been used to model an unconformity in a sub-volume and comparing it with a value of an iso-surface that represents the unconformity. For example, an iso-surface may be defined along a scale that corresponds to age. As an example, depending on order with which conformable sequences are modeled (e.g., from younger to older or from older to younger), one of two subsets of new sub-volumes may be selected and considered for processing a next conformable sequence. As an example, a periodic scale may be implemented to facilitate visualization of an implicit function (e.g. with respect to one or more features in a sequence).

As to interpolation of an implicit function corresponding to a conformable sequence, as an example, its distribution may be discontinuous across one or more internal borders of a background mesh and continuous elsewhere (see, e.g., FIGS. 7 and 8). As an example, interpolation may be performed in one or more sub-volumes of a background mesh that have been created and identified as corresponding to a "current" conformable sequence. As an example, data points that included in such one or more sub-volumes may be taken into account to constrain an interpolation of an implicit function. As an example, once an interpolation process has been performed to provide values for an implicit function, implicit horizons of the "current" conformable sequence may be transformed into explicit surfaces using one or more iso-surfacing algorithms.

Figure 9:
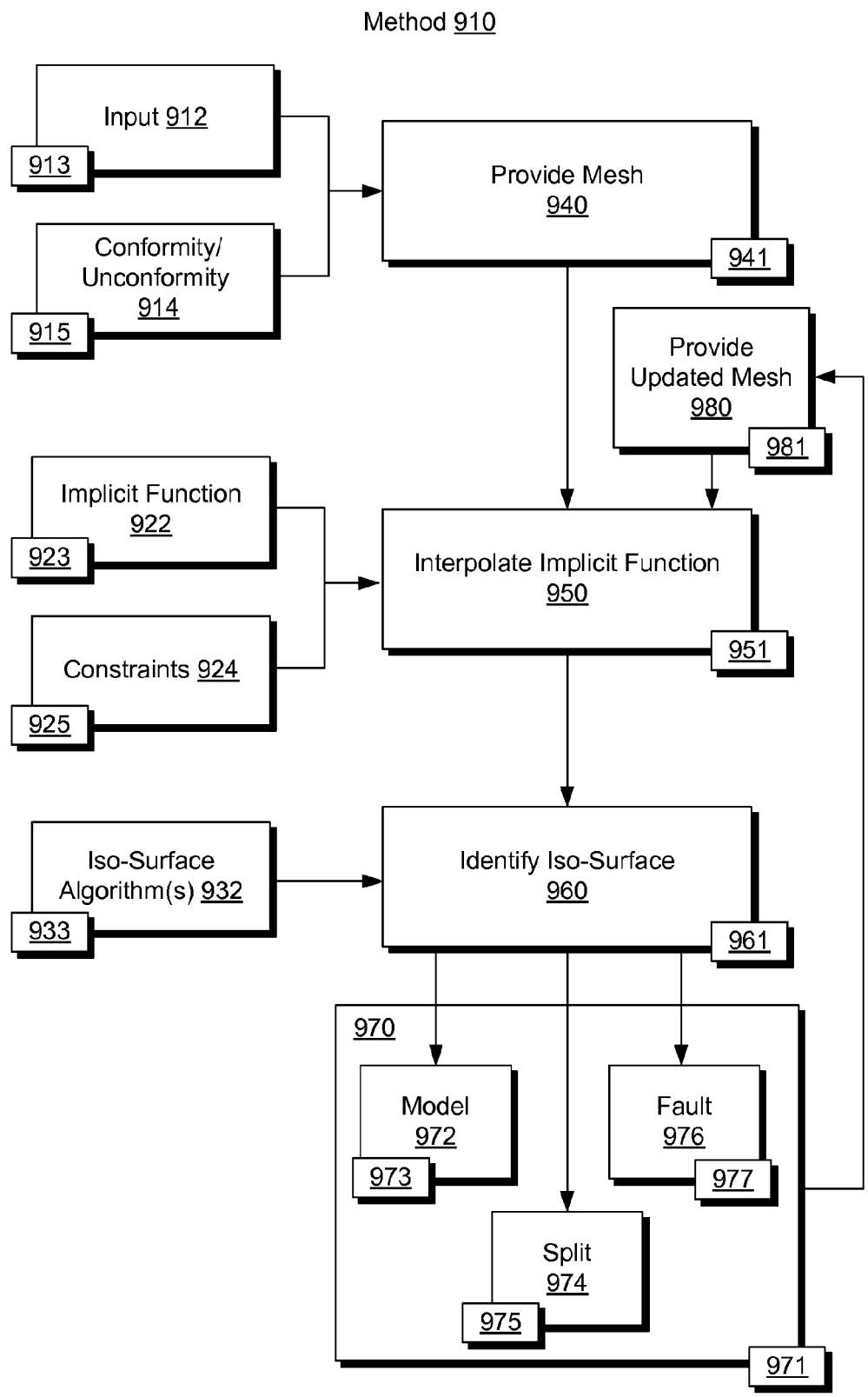
FIG. 9 illustrates an example of a method.

FIG. 9 shows an example of a method 910 that includes a provision block 940 for providing a mesh of a geologic environment that includes conformable sequences and an unconformity (or unconformities); an interpolation block 950 for interpolating an implicit function defined with respect to the mesh to provide values for the implicit function; and an identification block 960 for identifying an iso-surface based on a portion of the values where the iso-surface represents the unconformity, for example, as residing between two of the conformable sequences.

As an example, the provision block 940 may include providing the mesh, receiving the mesh, building the mesh, editing a mesh, etc. based at least in part on receiving input from an input block 912 and input from a conformity/unconformity block 914. As an example, the conformity/unconformity block 914 may provide for defining one or more unconformities in a mesh, for example, with respect to one or more conformal sequences. As an example, the conformity/unconformity block 914 may provide data associated with an unconformity, for example, where the data is represented as values, points, etc. in a mesh.

As an example, the interpolation block 950 may include receiving one or more implicit functions per an implicit function block 922 and include receiving one or more constraints per a constraints block 924. As an example, an implicit function (or implicit functions) may be constrained by one or more constraints. As an example, where a mesh includes nodes, one or more constraints may be defined with respect to a portion of those nodes. In such an example, a linear system of equations may be formulated and solved, for example, as part of an interpolation process to provide values for an implicit function (e.g., or implicit functions).

As an example, the identification block 960 may include receiving one or more algorithms, for example, for forming iso-surfaces given values within a region or regions such as a region or regions of a mesh. For example, an algorithm may receive as input values associated with an implicit function and then define iso-surfaces for at least some of those values. As an example, an iso-surface may correspond to a horizon, an unconformity, etc. As an example, a series of iso-surfaces may correspond to a conformable sequence, for example, where the conformable sequence is at least partially bound by an unconformity, which may be represented itself as an iso-surface.

In the example of FIG. 9, the method 910 may include a block 970 for performing one or more additional actions. For example, a model block 972 may provide for outputting a model based at least in part on the identified iso-surface where such a model may be used for modeling one or more physical phenomena associated with a geologic environment (e.g., including one or more processes applied to the environment such as injection, production, etc.). As an example, the block 970 may include a splitting block 974 for splitting or sub-dividing a mesh based at least in part on an identified iso-surface. For example, where the iso-surface corresponds to an unconformity, a mesh may be split into meshes based at least in part on that iso-surface (e.g., to form a first mesh and a second mesh where the unconformity may belong to one of the first mesh or the second mesh). As an example, the block 970 may include a fault block 976 for introducing one or more faults, for activation of one or more faults, for deactivation of one or more faults, etc.

As an example, the method 910 may include a provision block 980 for providing an updated mesh (e.g., receiving an update mesh via performance of a process or processes). For example, where splitting occurs per the splitting block 974, a mesh may be updated and provided to the interpolation block 950 for further processing (e.g., the interpolation block 950 may receive an updated mesh or updates meshes). As an example, the conformity/unconformity block 914 may provide input for updating a mesh. For example, where a mesh has been split into a first mesh and a second mesh according to a first unconformity, one of the first mesh and the second mesh may be further processed, for example, using data, etc. associated with another unconformity. In the example of FIG. 9, the method 910 may perform iteratively, for example, by looping to edit a mesh (e.g., whether an initial provided mesh, a subsequent mesh resulting from splitting, etc.) and to perform interpolation of one or more implicit functions with respect to an edited mesh.

The method 910 is shown in FIG. 9 in association with various computer-readable media (CRM) blocks 913, 915, 923, 925, 933, 941, 951, 961, 971, 973, 975, 977 and 981. Such blocks generally include instructions suitable for execution by one or more processors (or cores) to instruct a computing device or system to perform one or more actions. While various blocks are shown, a single medium may be configured with instructions to allow for, at least in part, performance of various actions of the method 910. As an example, a computer-readable medium (CRM) may be a computer-readable storage medium. As an example, the blocks 913, 915, 923, 925, 933, 941, 951, 961, 971, 973, 975, 977 and 981 may be provided as one or more modules, for example, such as the one or more modules 407 of the system 401 of FIG. 4.

As an example, a geologic environment may be characterized with respect to system tracts. For example, consider a systems tract as a sequence subdivision that includes one or more depositional units that may differ in geometry from another systems tract. As an example, seismic data may be processed to estimate one or more boundaries that may define, at least in part, a systems tract.

As an example, different systems tracts may represent different phases of eustatic changes. Eustasy pertains to sea level and its variations. Thus, eustatic changes may pertain to sea level changes, which may result, for example, from movement of tectonic plates that alter volume of an ocean basin, from climate effects on volume of water stored in glaciers/icecaps, etc. Eustasy can affect positions of shorelines and processes of sedimentation, which can make interpretation of eustasy a useful aspect of sequence stratigraphy.

As an example, a lowstand systems tract (LST) may develop during times of relatively low sea level; a highstand systems tract (HST) may develop at times of high sea level; and a transgressive systems tract (TST) may develop at times of changing sea level.

A lowstand systems tract (LST) may be a systems tract overlying a sequence boundary (SB) and overlain by a transgressive surface (TS). A lowstand systems tract (LST) may be characterized by a progradational to aggradational parasequence set. As an example, a lowstand systems tract (LST) may be a basin-floor fan, a slope fan, a lowstand wedge, etc.

A highstand systems tract (HST) may be a systems tract bounded below by a downlap surface (DS) and above by a sequence boundary (SB). A highstand systems tract (HST) may be characterized by an aggradational to progradational parasequence set.

As an example, method may provide for automatic systems tract detection. For example, consider a method that includes providing a defined 3D stratigraphic function (e.g., as a type of implicit function); automatically detecting a continental shelf break; and based on one or more predefined rules (e.g., aggradation, progradation, retro-gradation, forced regression, etc.), characterizing behavior of the continental shelf break (e.g., where the process may be able to identify one or more systems tracts).

Figure 10:
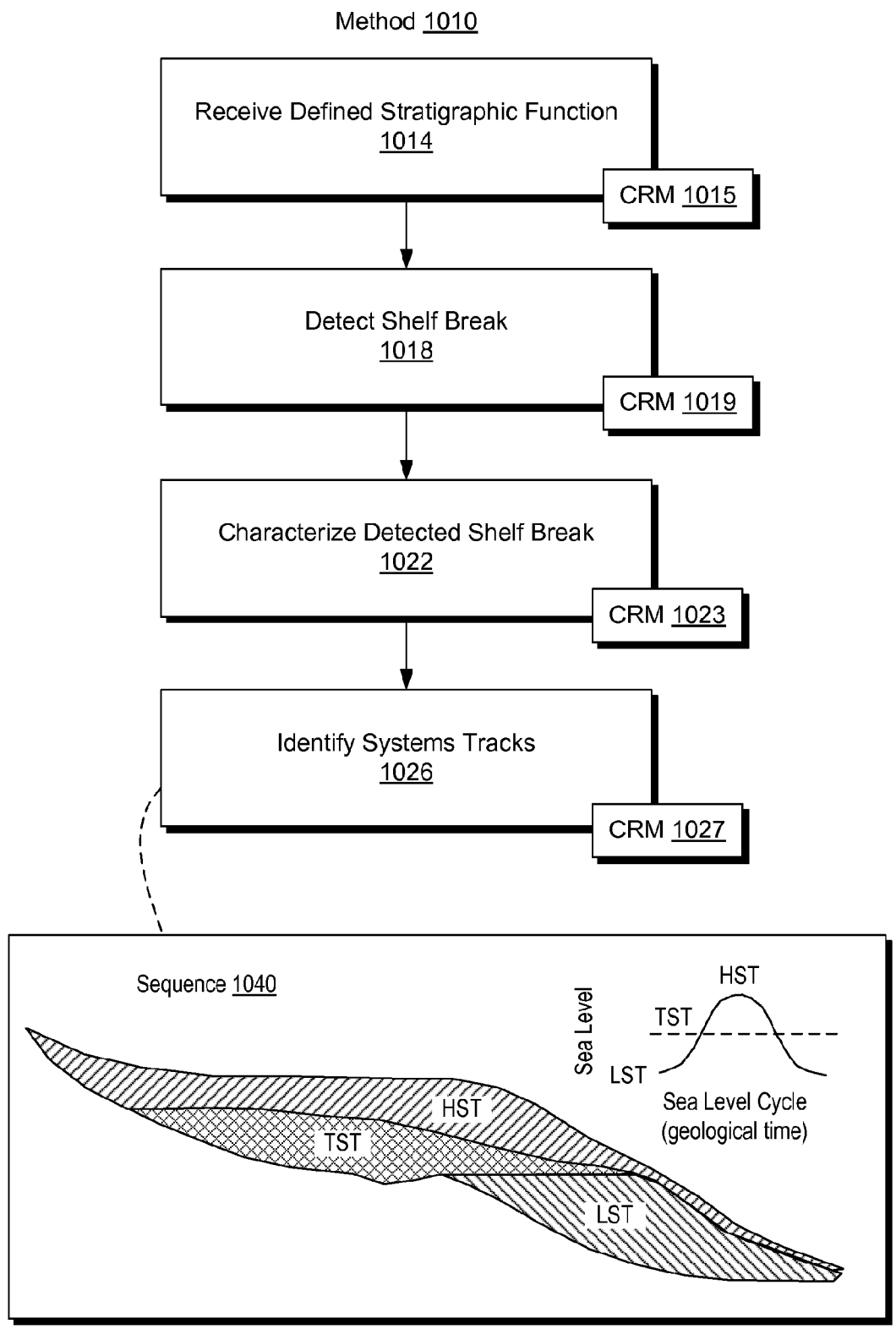
FIG. 10 illustrates an example of a method and an example of a sequence along with a plot of sea level variations with respect to geological time.

FIG. 10 shows an example of a method 1010 that includes a reception block 1014 for receiving a defined stratigraphic function, a detection block 1018 for detecting a shelf break, a characterization block 1022 for characterizing the shelf break and an identification block 1026 for identifying at least one tract (e.g., a systems tract).

FIG. 10 also shows an example of a sequence 1040, schematically as a section of a third-order sequence along with its various systems tracts (LST, TST and HST). As shown, a plot of sea level versus geological time may be defined by segments in time such that a LST segment progresses to a TST segment, which progresses to an HST segment where segments may be demarcated by transition points (e.g., anchor points, etc.).

As another example, a third-order sequence may include a depositional order with respect to geological time as follows: (i) sequence boundary formation and lowstand systems tract/fan deposition (e.g., rate of eustatic fall exceeds rate of subsidence, sea level falls to shelf break, shelf is exposed, incised; canyon cut, slope-perched deltas and submarine fans are deposited); (ii) lowstand systems tract/wedge deposition (e.g., rate of eustatic fall decreases, reaches a stillstand, and rises slowly, submarine fan deposition ceases, incised valleys fill with coarse-grained, low-sinuosity channel or estuarine sandstones in response to sea level rise, shale-prone wedge with thin, fine-grained turbidites forms on the slope, then downlaps the top of the submarine fan); (iii) transgressive systems tract deposition (e.g., rate of rise is at a maximum, during brief slowdowns in the rate of rise, parasequences (fourth-order sequences) prograde; but overall they stack in a backstepping pattern, organic-rich (condensed) section moves up onto the shelf, fluvial systems may shift from braided to meandering pattern); and (iv) highstand systems tract deposition (e.g., rate of sea level rise is at a minimum; in the late highstand, it falls slowly, depositional rates exceed rate of sea level rise, causing parasequences to build basinward in aggradational to progradational parasequence sets, parasequences downlap onto the condensed section).

The method 1010 is shown in FIG. 10 in association with various computer-readable media (CRM) blocks 1015, 1019, 1023, and 1027. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1010. As an example, a computer-readable medium (CRM) may be a computer-readable storage medium. As an example, the blocks 1015, 1019, 1023, and 1027 may be provided as one or more modules, for example, such as the one or more modules 407 of the system 401 of FIG. 4.

As an example, a method may include receiving information as to identity of one or more sequence boundaries. As an example, a method can include identifying one or more sequence boundaries.

As an example, a shelf break may be a continental shelf break, for example, an area at an edge of a continent from a shoreline. For example, consider an edge at a depth of about 200 m where a continental slope begins.

Figure 11:
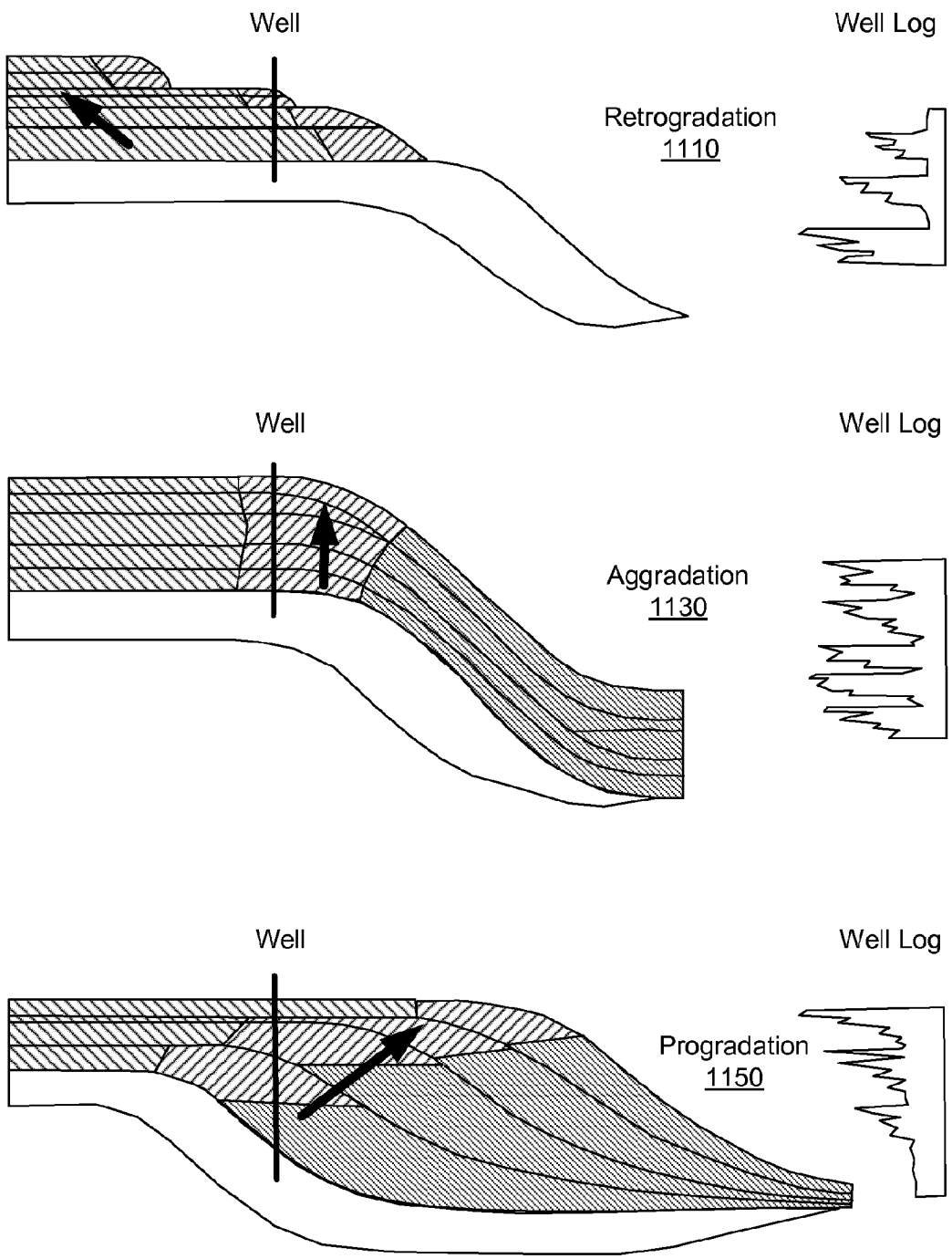
FIG. 11 illustrates examples of retrogradation, aggradation and progradation.

FIG. 11 shows example graphics 1110, 1130 and 1150 with respect to systems tract separation identification, for example, where identification may be based in part on data such as well log data. In FIG. 11, the graphic 1110 shows an example of a retrogradation scenario with a well and an example of a corresponding well log. The graphic 1130 shows an example of an aggradation scenario with a well and an example of a corresponding well log. The graphic 1150 shows an example of a progradation scenario with a well and an example of a corresponding well log.

As an example, retrogradation may be characterized by accumulation of sequences by deposition in which beds are deposited successively landward, for example, where sediment supply may be limited and unable to fill available accommodation. For example, the position of a shoreline may migrate backward onto land, a process called transgression, during episodes of retrogradation.

As an example, aggradation may be characterized by accumulation of stratigraphic sequences by deposition that stack beds atop one another, for example, building upwards during periods of balance between sediment supply and accommodation.

As an example, progradation may be characterized by accumulation of sequences by deposition in which beds are deposited successively basinward, for example, where sediment supply exceeds accommodation. For example, the position of a shoreline may migrate into a basin during episodes of progradation (e.g., regression).

Figure 12:
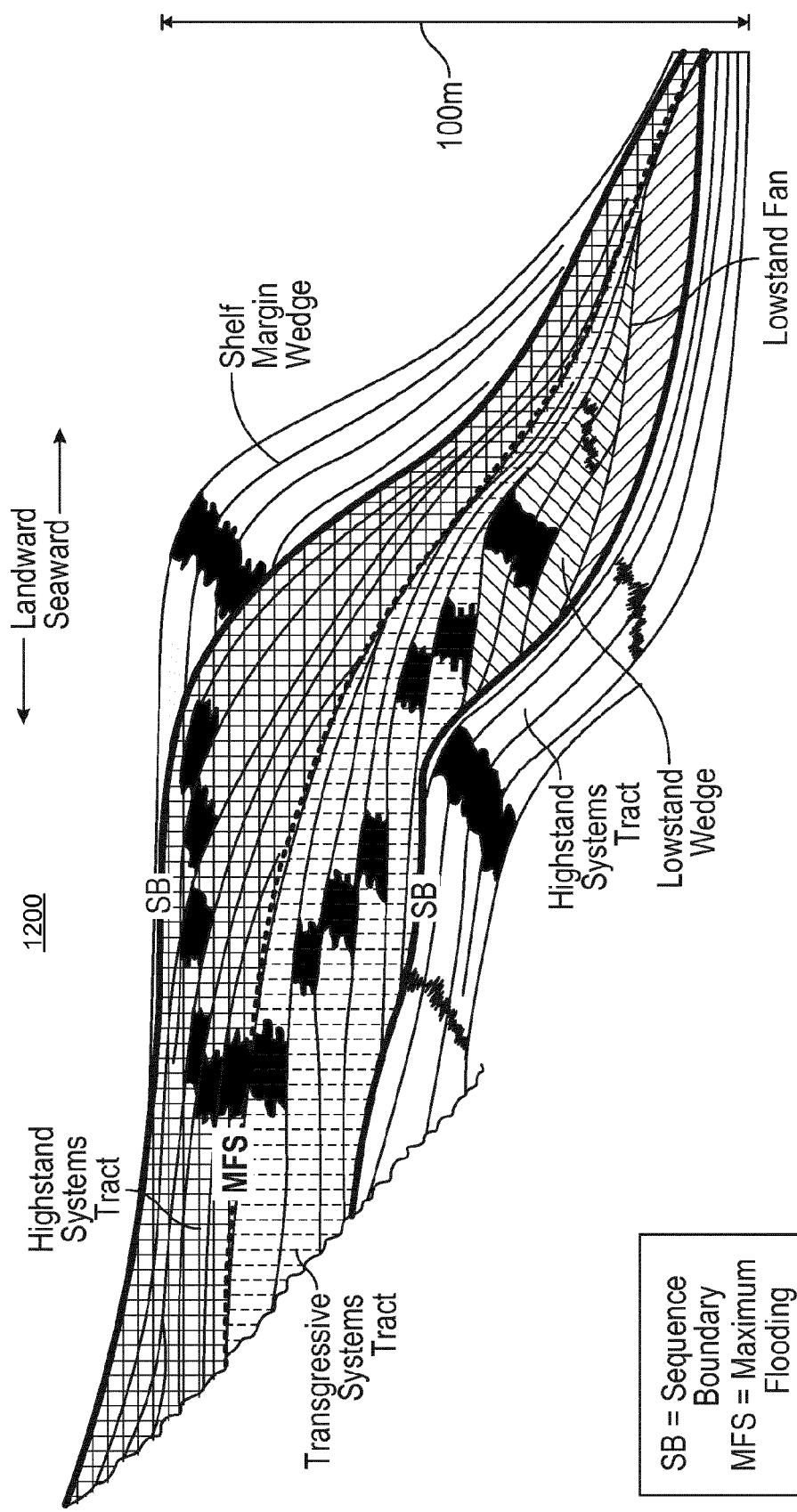
FIG. 12 illustrates examples of systems tracts.

FIG. 12 shows an example of a graphic 1200 with respect to sequence stratigraphy identification. As an example, a method may include providing an implicit function and identifying one or more sequence boundaries. The graphic 1200 shows examples of some types of sequence boundaries, one or more HSTs, a transgressive systems tract (TST), a shelf margin wedge, a lowstand fan, lowstand wedge, etc.

As an example, a workflow may include one or more manual processes, semi-automated processes and/or automated processes, for example, to facilitate interpretations of one or more sub-surface environments. As an example, a workflow may allow a user to isolate a conformable surface corresponding to a certain geological age, for example, by selecting a constant within a "relative geological time" cube. As an example, a workflow may include pushing forward the analysis of one or more of such cubes for analysis of sequence stratigraphy. Geologically, the relative base sea-level variation can impact a depositional environment, facies distribution pattern and, for example, reservoir quality within one or more given stratigraphic zones.

As an example, a method may provide for assigning stratigraphic system's tracts in multiple dimensions, for example, with an ability to interactively edit results (e.g., intermediate results, etc.). As an example, a workflow may allow for manual, semi-automated and/or automated calibration processes as to corrective measures. For example, consider a workflow that automatically assigns tracts and that includes interactively adjusting one or more tracts where automatic calculation deviates from an acceptable result.

As an example, a method can include gathering and embedding identification logic of systems tracts in a manner that may allow for automated zonation of one or more volumes of interest (VOIs).

Referring again to FIG. 11, some examples of depositional trends are illustrated, specifically progradation, aggradation and retrogradation. In an environment, one or more combinations of such trends may provide a stacking pattern.

As an example, "systems tracts" can refer to behavior of a shoreline. For example, consider shoreline behaviors characterized as normal regressive, forced regressive and transgressive. As mentioned with respect to FIG. 12, system tracts can include, for example, a lowstand systems tract (LST), a highstand systems tract (HST), a transgressive systems tract (TST) and a falling stage systems tract (FSST).

The example stratigraphy 1200 of FIG. 12 is based on sea level information indicating that sea level has fluctuated through the Phanerozoic at a variety of cycle orders. For example, consider the following cycle orders: first order cycles lasting from 200-400 million years related to changes in the volume of the ocean basins caused by continental dispersal and collision; second order cycles as discerned from six unconformity bound stratigraphic sequences in the Phanerozoic rocks of North America spanning 10 s-100 m.y., caused by changes in the volume of oceanic ridges, related to changes in spreading rates; third order cycles with durations of about 1 m.y. to about 10 m.y., about 2.5 m.y. in length; and fourth and fifth order cycles of about 500 ky-200 ky and about 200 ky-10 ky documented in periods of the Phanerozoic in both shallow marine and pelagic strata.

As an example, tidal cycles may be evident as local sediment cycles noted in rock records that may be related to ocean and lake tides generated by the orbital cycles of the earth-sun-moon system. Such cycles can have periods ranging from daily to annual.

In the two-dimensional stratigraphy 1200 of FIG. 12, the shelf-break may be represented as an inflection point closest to the shore of the spatial derivative of a given "sigmoidal" stratigraphic layer interface; noting that in three-dimensions, it may be represented as a multi-z surface. As an example, a detection technique can include computing inflection points associated with iso-stratigraphic lines (2D) and/or surfaces (3D), which may be represented at least in part via one or more implicit functions' (e.g., stratigraphic functions') iso-values.

Figure 13:
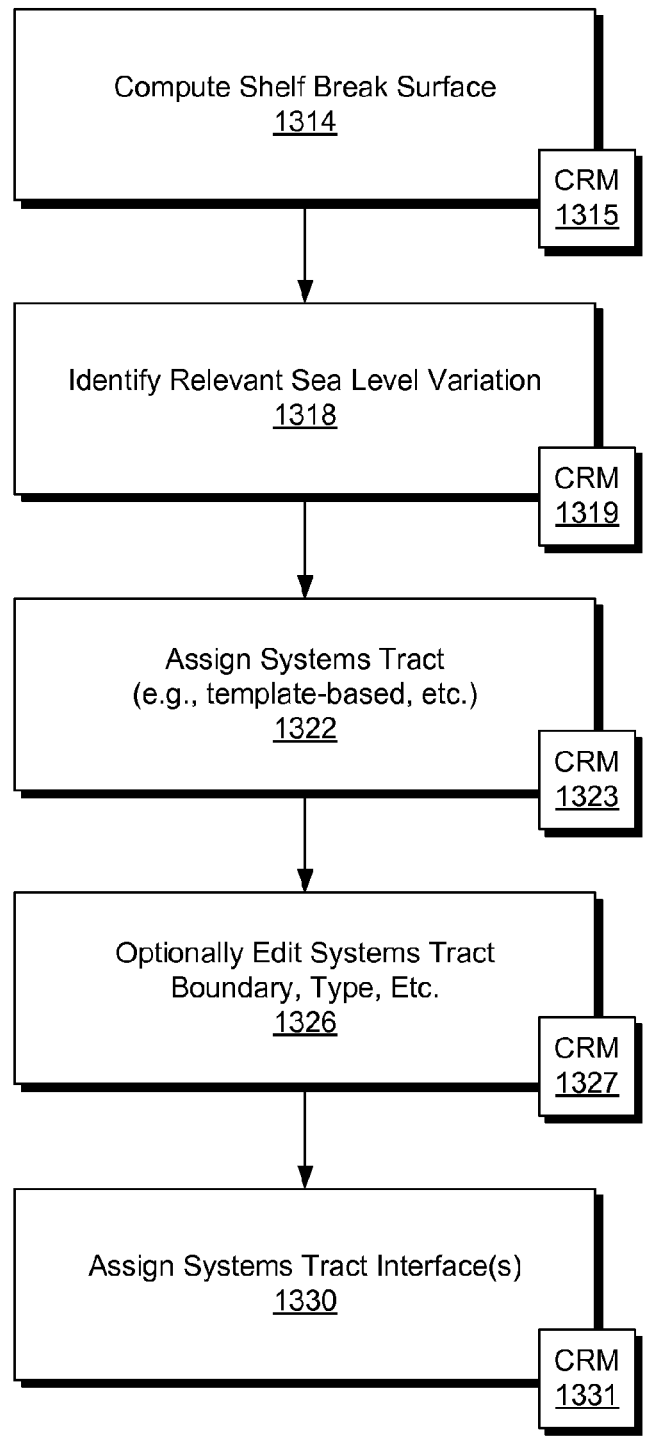
FIG. 13 illustrates an example of a method.

FIG. 13 shows an example of a method 1310 that includes a computation block 1314 for computing a shelf break (e.g., lines, surface, etc.), an identification block 1318 for identifying relevant sea level variation, an assignment block 1322 for assigning one or more systems tracts (e.g., template-based, etc.), an optional edit block 1326 for editing one or more systems tracts (e.g., boundary, type, etc.), and an assignment block 1330 for assigning one or more systems tract interfaces.

As to the computation block 1314, as an example, it may include an algorithm that can determine a first inflection point of a first order spatial derivative (e.g., bell shape) of a kx/ky filtered stratigraphic function (e.g., also consider a second order derivative where the inflection points corresponds to a formulation such as implicit_function"(x, y, z, age)=0). As an example, the computation block 1314 may include determining a maximum stratigraphic thickness for a given stratigraphic range. As an example, the computation block 1314 may include rendering information to a display. For example, consider rendering a shelf break line, a shelf break surface, etc. to a display, optionally in combination with data such as, for example, seismic data and/or information derived at least in part from seismic data (e.g., one or more seismic attributes, etc.).

As an example, a curve may be characterized by relatively short straight line segments near a point of inflection, noting that the radius of curvature of a straight line approaches infinity and that the radius of curvature at points of inflection also approaches infinity. As an example, a method can include computing one or more geometric properties that may be based on, directly or indirectly, radius of curvature.

As an example, curvature may be defined as change in angle of a tangent divided by a change in arc length, noting that magnitude of curvature can be estimated by magnitude of a second derivative of a parameterization of a curve at a specific point. Curvature, defined in a 3D space, can be a measure of how much a curve "bends" at a single point, which may be characterized as a rate of change of an angle formed between a tangent and the curve as the tangent is drawn along the curve.

As an example, a method can include computing radius of curvature, for example, as the absolute value of a differential of arclength along a curve (e.g., ds) and an angle of a tangent (e.g., $\Theta$). For example, radius of curvature may be determined using the following equation: $\rho = |ds/d\Theta|$.

As an example, radius of curvature may be defined in terms of derivatives of a curve, for example, consider the following equation:

$$\rho = [(fx^2+fy^2)^{3/2}]/[fxxfy^2 - 2fxyfxfy + fyyfx^2]$$

As an example, a method can include computing one or more radii of curvature and determining whether a center of a radius of curvature is to a land side or a water side of a shelf break. As an example, a method can include analyzing one or more radii of curvature with respect to a dimensional parameter, which may act to characterize types of phenomena associated with a geologic environment. For example, retrogradation, aggredation and progradation may exhibit particular scales of radii of curvature (see, e.g., the shelf break of the rendering 1600 of FIG. 16).

An inflection point can be defined to be a point on a curve at which the sign of the curvature (e.g., concavity) changes. Inflection points may be stationary points. For example, for the curve $y=x^3$, the point $x=0$ is an inflection point. As an example, a first derivative analysis may be applied to identify one or more inflection points and, for example, to distinguish inflection points from extrema. In such an example, the first derivative analysis may be applied to a differentiable function. As an example, a function may be defined in one or more dimensions (e.g., $f(x)$, $f(x,y)$, $f(x,y,z)$, etc.). As an example, a function may be an implicit function such as, for example, a stratigraphic function.

As an example, an analysis may include computing one or more other derivatives. For example, consider a second derivative analysis as, for example, a condition for x to be an inflection point can be $f''(x)=0$ (e.g., noting that multiple dimensions in space and/or time may be considered). As an example, a sufficient condition can be $f''(x+\text{epsilon})$ and $f''(x-\text{epsilon})$ are to have opposite signs in the neighborhood of x.

As an example, an implicit function (e.g., a stratigraphic function) may be received as associated with a geologic environment and analyzed via computations of one or more derivatives to provide points of inflection. As an example, such points of inflection may correspond to a shelf break. An analysis may be performed to compute points of inflection that form a surface, for example, a shelf break surface that spans a geological time. Where an implicit function is analyzed for points of inflection, values of the implicit function can correspond to relative geological time. As an example, a shelf break surface may span a range of values of an implicit function, which, for example, may correspond to relative geological time.

As an example, a method may optionally include computing information as to slope break. As an example, shelf break may pertain to inflection points between a shelf and slope profile along depositional sequence boundaries, while slope break may pertain to inflection points between a slope and basin floor portion of a profile. In such context, the shelf break can mark the down dip limit of sub-aerial erosion produced by the loss of accommodation during relative falls in sea level and the slope rise can be a vertical distance between the shelf break and the slope break, while slope run is the horizontal distance. As an example, slope rise and run may be analyzed as to development and distribution of deep-water plays in geologic records.

As an example, a shelf break may occur inboard of a continental margin (e.g., epicontinental shelf breaks) or, for example, coincident with a continental margin (e.g., continental shelf breaks). As an example, an epicontinental shelf break may have a relatively short slope run where a coeval shelf and slope break are of the order of kilometers apart. As an example, relatively small seaway-floor fans may develop in epicontinental settings when the slope rise begins to exceed a distance of about 150 m. As an example, a continental shelf break may have a relatively long slope run and robust slope rise.

As an example, a method may include differentiating epicontinental shelf breaks (e.g., characterized by slopes with short runs) from continental shelf breaks (e.g., characterized by slopes with long runs), for example, to explain and/or predict development and distribution of deep-water plays in the geologic record.

As to kx/ky filtering, as an example, it can include low frequency filtering that may attenuate surface wave noise, for example, via wave-number filtering in X and Y dimensions over low frequency ranges. Such a filter may be implemented for data in the shot domain and may be applied to cross-spreads in an azimuthal mode. Such filtering may help to diminish ground-roll and other linear noise from shots. A kx/ky filtering algorithm may include one or more transforms, for example, to transform data to a frequency-wavenumber domain. A frequency dependent mix of adjacent traces may be performed in the wave-number domain for a specified range of frequencies where the mix may be dependent on, for example, velocity, frequency range, and X and Y wave-numbers. Such an algorithm may then include returning filtered data to a time-space domain.

As to the identification block 1318, as an example, it may provide a surface that has been deposited horizontally, for example, a paleo-horizontal surface. In such an example, the surface may be assigned to a topset of a sigmoidal layer. As an example, the identification block 1318 may include grouping of one or more phases according to one or more classification criteria. For example, consider grouping of phases according to one or more of progradation, aggradation, retrogradation, and regression criteria. As an example, the identification block may include generating data that may be used to render a plot such as a relative eustasy plot with respect to relative geological age of a stratigraphic function (e.g., as an attribute of a surface such as a shelf break surface).

As to the assignment block 1322, as an example, it may assign one or more systems tracts based on one or more templates. As an example, a distinction may be made between LST and HST based at least in part on one or more event terminations. For example, consider LST being associated with onlap on erosion (sequence boundary, SB); HST being associated with no onlap or onto a shore-face or on a "discontinuous" shelf break surface.

As to the edit block 1326, as an example, it may provide for interactive editing of one or more systems tracts. For example, consider editing a boundary and/or a type. As an example, interactive editing may include rendering a visual representation of a shelf break to a display and providing an interactive visual clue on a seismic section. As an example, an editing feature (e.g., editing tool) may allow for stretching and/or squeezing a eustatic curve relative to one or more geological ages. For example, consider altering a relative eustasy plot with respect to relative geological age of a stratigraphic function. As an example, an editing feature (e.g., editing tool) may allow for moving one or more anchors with respect to a eustatic curve, a relative eustasy plot, etc. For example, consider moving one or more of an HST, a FSST, a LST and a TST anchor.

As to the assignment block 1330, as an example, it may include assigning one or more systems tracts interfaces. For example, consider assigning a minimum flooding surface (MFS) based at least in part on information as to a TST going to a HST and/or assigning a sequence boundary (SB) based at least in part on information as to a LST going to a TST. As an example, the assignment block 1330 may be rule-based and/or based on other knowledge. For example, within a basin depocenter, a sequence boundary (SB) may include a conformity that correlates with an erosional unconformity along a margin of the basin. In such an example, conformities and unconformities may be identified and analyzed in making one or more interface assignments.

As an example, the assignment block 1330 may follow the assignment block 1322, for example, without editing per the edit block 1326. As an example, the method 1310 may optionally be automated and/or semi-automated. As an example, an automated method may include receiving information and outputting information as to one or more assignments (e.g., per the assignment block 1322 and/or the assignment block 1330).

As an example, the method 1310 may optionally include one or more additional blocks. For example, consider a petroleum systems analysis block that may receive as input information about systems tracts and/or interfaces thereof. As an example, certain types of hydrocarbon traps may be associated with a particular depositional systems tract. For example, identifying a highstand, lowstand, or transgressive systems tract and the specific depositional environments within each may assist with prediction of possible reservoir, seal, and charge system for one or more potential traps.

As an example, a method may include outputting information as to one or more systems tracts based at least in part on a shelf break computed from an implicit function or implicit functions. As an example, a deposition systems tract may be a subdivision of a sea level cycle as a depositional phase, which may assist with construction of a paleogeographic map (e.g., one or more for a depositional systems tract). Such a map may assist with prediction of reservoir and seal rock as well as, for example, delineation of probable migration avenues. As an example, a relatively high-resolution age model may be constructed and used to correlate and calibrate one or more depositional sequences. Given such an age model and stratigraphic thicknesses, rock accumulation rates of individual cycles may be calculated and, for example, thermal history for individual depocenters reconstructed.

As an example, a method can include outputting an order of a cycle or the phase of a cycle represented by a rock sequence, for example, for predicting location and type of reservoir and seal and location of potential source rocks.

The method 1310 is shown in FIG. 13 in association with various computer-readable media (CRM) blocks 1315, 1319, 1323, 1327 and 1331. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1310. As an example, a computer-readable medium (CRM) may be a computer-readable storage medium. As an example, the blocks 1315, 1319, 1323, 1327 and 1331 may be provided as one or more modules, for example, such as the one or more modules 407 of the system 401 of FIG. 4.

As an example, a method such as the method 1310 of FIG. 13 may operate using iso-values of an implicit function (e.g., optionally as a stratigraphic function).

Figure 14:
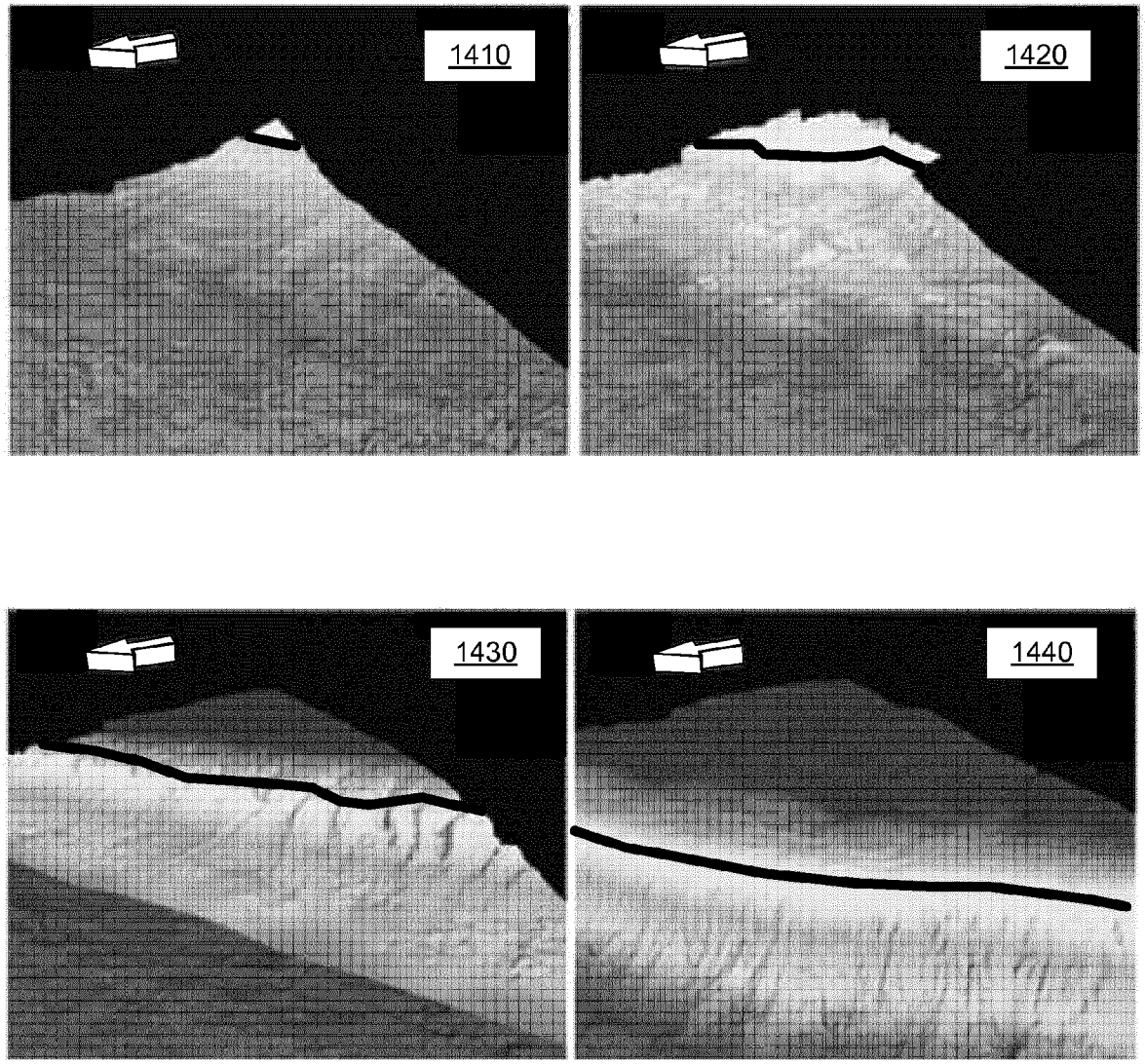
FIG. 14 illustrates an example of a geologic environment that includes a shelf break.

FIG. 14 shows examples of perspective renderings of a sub-surface environment, for example, as elevation times spanning from oldest (lower left) to newest (upper right) where time progresses from a rendering 1410, to a rendering 1420, to a rendering 1430 and to a rendering 1440. In the renderings 1410, 1420, 1430 and 1440, a computed shelf break is illustrated as a series of lines, which, collectively, may form a surface (e.g., a shelf break surface).

As an example, the method 1310 can include computing, per the computation block 1314, a surface representing, in 3D, a shelf break, which may be performed for multiple stratigraphic layers. As an example, a shelf break can mark a split between a continental shelf and a deep sea environment. As an example, the computation block 1314 may consider that a shelf break can be represented as an inflection point closest to the shore of a spatial derivative of a given "sigmoidal" stratigraphic layer interface. In a 3D space, a shelf break may be represented as a multi-z surface; noting that where tectonic faulting exists that may have altered continuity of stratigraphic layers, structural restoration (e.g., un-faulting, etc.) may be applied (e.g., prior to computing a shelf break).

Referring again to FIG. 14, the perspective renderings 1410, 1420, 1430 and 1440 illustrate spatial variation of a shelf break relative to an onshore observation point that can, for example, characterize the extent of a continental shelf. Thus, the renderings 1410, 1420, 1430 and 1440 form a series that can illustrate the evolution of a shelf break offshore a continent (e.g., Australia's Westralian basin). As an example, the evolution of the shelf break may be correlated with a relative variation of sea level. As an example, a method may include computing a shelf break based on a combination between subsidence and eustasy.

As an example, a method can include correcting for geo-morphological evolution of a sub-surface, for example, to more particularly establish the relative rise or fall of sea level. As an example, a "topset" of each sigmoidal event may be used locally as a referential for a paleo-horizontal surface.

As an example, a slice through a model perpendicular to a shelf break line may be used to extract shelf break evolution through time, for example, via the following transform:

Shelf_break_evolution(x,y, [Progradation;Aggradation;Retrogradation;Regression])→Shelf_break_evolution($\Delta$,RGT)

In such an example, a method may include distinguishing different "gradation" types and "shoreline direction", where the latter may be specified by a "topset" assignment.

As an example, a method can include using a processed curve and a template assigning one or more parts of one or more cycles with systems tracts. In such an example, the method may "paint" intervals corresponding to specific systems tracts onto a "3D shelf-break surface".

As an example, a method may include one or more algorithms, criteria, etc. to distinguish a LST from a HST, for example, involving a study of reflector terminations. Referring to FIG. 12, consider LST onlap onto a "base" surface (e.g., erosive surface conforming to the package below) in conjunction to "shape" of a shelf break function. As illustrated in FIG. 12, the latter can have a "discontinuous" (e.g., seaward trended) behavior between a HST and following LST.

As an example, a method can include associating corresponding systems tracts boundaries with iso-value intervals of a 3D stratigraphic volume (e.g., implicit function volume) and rendering (e.g., painting, etc.) systems tracts onto information of a volume of interest.

Figure 15:
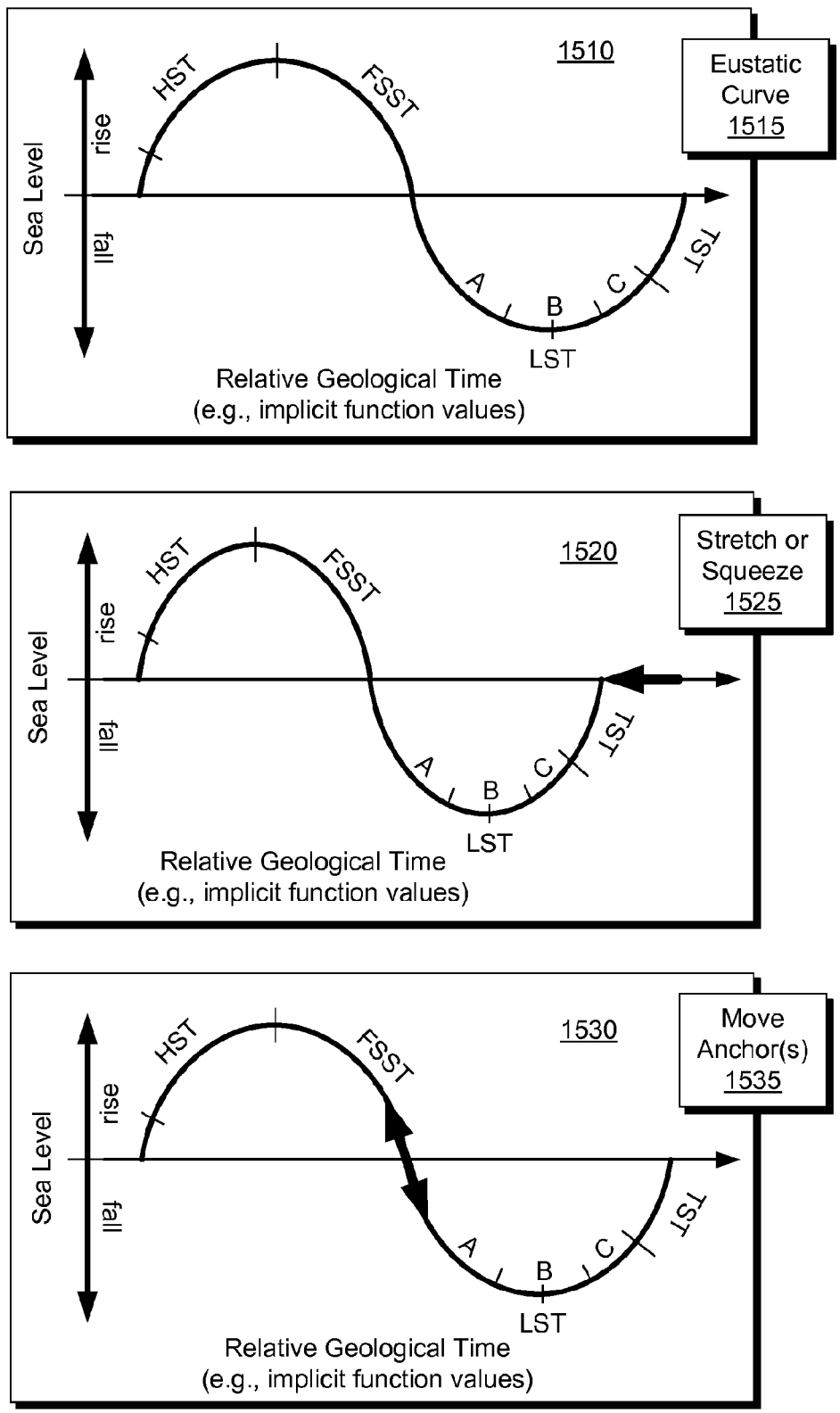
FIG. 15 illustrates examples of eustasy curves with respect to geological time.

FIG. 15 shows example plots 1510, 1520 and 1530 along with a eustatic curve block 1515, a stretch or squeeze block 1525 and an anchor movement block 1535, respectively. As mentioned, tracts may be assigned and illustrated with respect to a eustatic curve such as, for example, the eustatic curve of the plot 1510, which is illustrated with respect to relative geological time. As mentioned with respect to the edit block 1326 of the method 1310 of FIG. 13, editing may include stretching or squeezing such as indicated in the plot 1520 per the stretch or squeeze block 1525 and/or editing may include moving one or more anchors as indicated in the plot 1530 per the anchor movement block 1535. As an example, one or more edits may be made for adjustment to results, which may be, for example, auto-computed results. As an example, an adjustment may aim to calibrate results with one or more geological models.

As an example, a method may include selecting one or more templates, for example, consider selecting one or more templates for defining different systems tracts. Such an approach may provide flexibility that can accommodate a method to handle different depositional environments (e.g., deep sea turbiditic stacked channels, coastal plain deposition, etc.). The plot 1510 of FIG. 15 may be considered to be one amongst other models that may be adequate based on knowledge of depositional environments. Again, the plot 1510 of FIG. 15 illustrates systems tracts split as a function of relative sea level variations where splits may be indicated by one or more anchors.

As an example, a method can include interactively adjusting a model, for example, to locally calibrate the model with back-ground amplitude volume. As an example, the plots 1510, 1520 and 1530 of FIG. 15 may be illustrated with respect to implicit function values. For example, consider a rainbow of colors (e.g., or rainbows of colors) that represent implicit function values along the relative geological time dimension.

In the plots 1510, 1520 and 1530 of FIG. 15, the plot 1510 may be considered to be a template/sequence stratigraphic model that has been hooked with a stratigraphic function such that points on the "fall/rise" curve have an abscissa corresponding to a value of the stratigraphic function (e.g., a value of an implicit function). Per the stretch or squeeze block 1525, stretching and/or squeezing the model may have, as an effect, to respectively lower and/or increase frequency of alternation of different systems tracts, for example, making them thicker and/or thinner, respectively. As an example, individually adjusting the interface on the fall/rise curve between two systems tracts can act to position the corresponding stratigraphic layer boundary on different seismic events. Such an approach can allow for refinement and correlation work.

As an example, an edit tool may provide a capacity to "insert" intermediate "fall/rise" cycles (e.g., or partial cycles), for example, in case an automatic extraction of a shelf break function may not capture a high order sequence. As an example, an edit tool may provide a capacity to "remove" intermediate "fall/rise" cycles (e.g., or partial cycles), for example, in a case where an automatic extraction of a shelf break may have captured noise (e.g., rather than meaningful data).

As an example, the assignment block 1330 of the method 1310 of FIG. 13 may include assigning one or more interfaces between systems tracts where such interfaces may define specific sequence stratigraphic surfaces such as one or more of a maximum flooding surface (MFS), a transgressive surface (TS), and a sequence boundary (SB). Such surfaces may be utilized with respect to a petroleum systems analysis. For example, maximum flooding surfaces can mark times of maximum flooding or transgression of a shelf and separate transgressive and highstand systems tracts. In such an example, the latter may be characterized by the presence of radioactive and often organic rich shales, glauconite, and hardgrounds, and thus may coincide with source rock; noting that transgressive sands may be considered to be good reservoirs.

As an example, a method can include using a systems tracts volume as part of one or more facies modeling workflows. In such an example, the systems tracts information may enrich results and, for example, constrain outcomes to sequences stratigraphic concepts.

Figure 16:
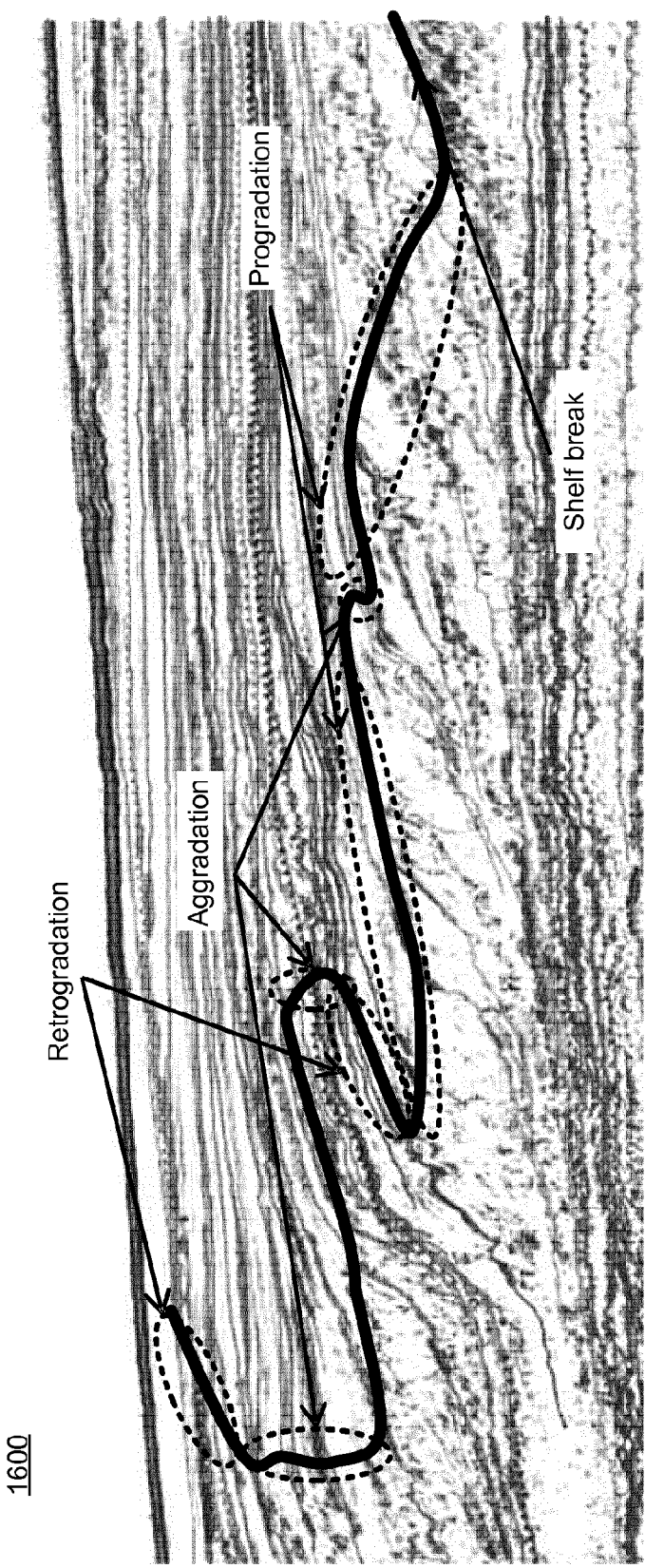
FIG. 16 illustrates an example of a geologic environment that includes a shelf break and instances of retrogradation, aggradation and progradation.

FIG. 16 shows an example of a rendering 1600 of seismic data and systems tracts information. The rendering 1600 is a two-dimensional section of the sub-surface environment illustrated in the example renderings 1410, 1420, 1430 and 1440 of FIG. 14. As shown in FIG. 16, the shelf break can be characterized with respect to systems tracts and phenomena such as, for example, one or more periods of retrogradation, aggradation and progradation.

Figure 17:
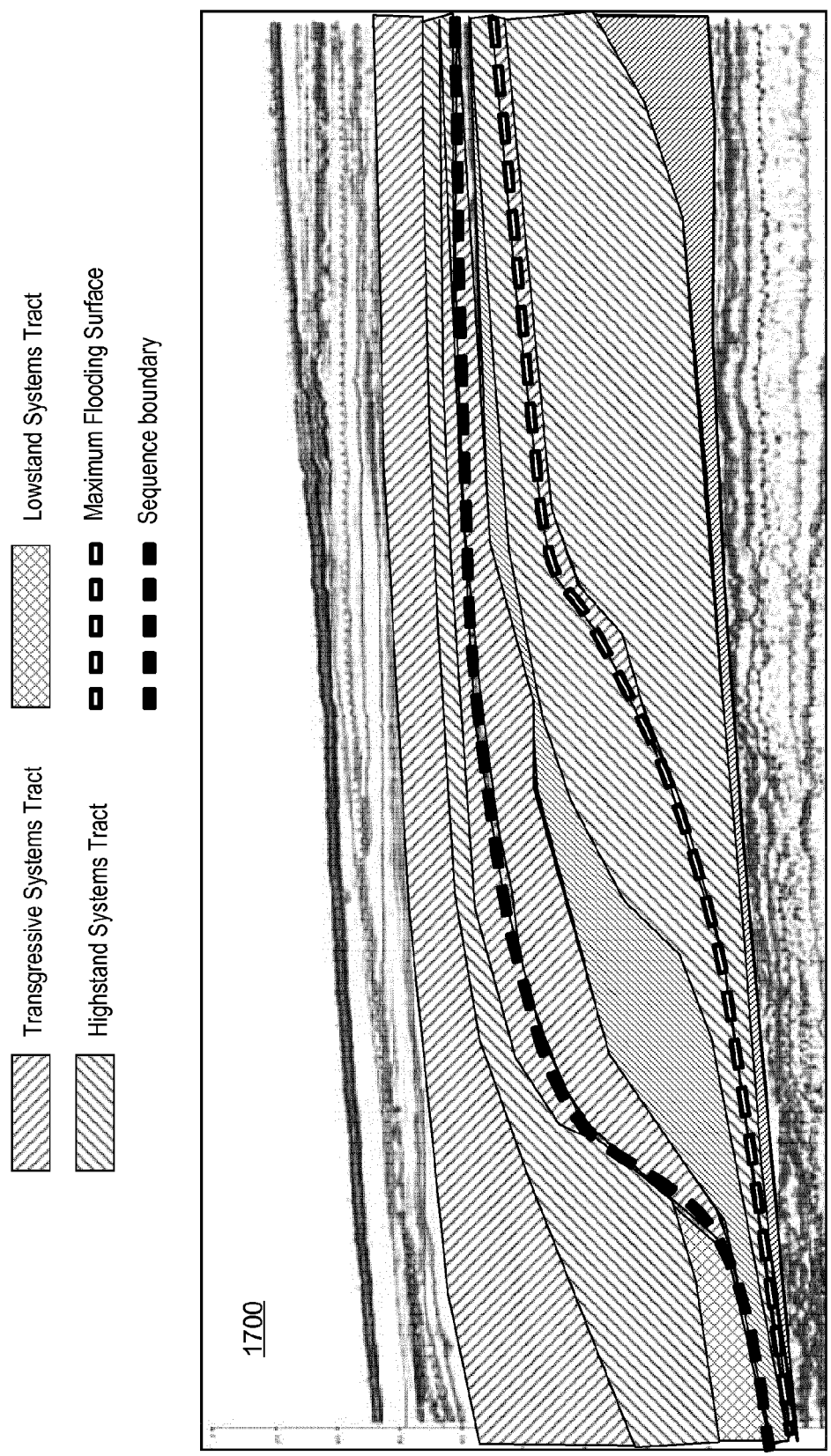
FIG. 17 illustrates an example of a geologic environment that includes assigned systems tracts and assigned interfaces.

FIG. 17 shows an example of a rendering 1700 that is based at least in part on the information of the rendering 1600 of FIG. 16. In the rendering 1700, various systems tracts are assigned (e.g., TST, HST and LST) along with a minimum flooding surface (MFS) and a sequence boundary (SB) surface. As mentioned, such information may be utilized in one or more workflows. For example, consider a petroleum systems workflow that utilizes such information to assist with identification of one or more types of rock, structures, etc. that may be associated with reservoir formation, etc.

As an example, a workflow may include analyzing depositional history. As an example, variation in lateral extent of seismic features may be analyzed in a chronostratigraphic order. As an example, a Wheeler representation of information (e.g., in a Wheeler space or Wheeler domain) may be generated to illustrate migration of depositional source material and, for example, to reveal depositional history based on super-position placement on a time-history axis. As an example, an analysis of seismic stratigraphy and borehole geology (e.g., well logs) may provide insight as to facies distribution (e.g., consistent with borehole bedding and orientation interpretation).

As an example, a workflow may include analyzing information pertaining to a geologic environment where the information may include information such as seismic information and, for example, well log information. In such an example, the workflow may include removing faulting (e.g., and one or more other deformations) to correlate at least a portion of seismic information to depositional units in one or more horizontal stratigraphic sequences.

As an example, a method may include automatic reconstruction model building. As an example, a method may include transforming information to a Wheeler space (e.g., or Wheeler domain) and transforming information from a Wheeler space (e.g., or Wheeler domain). As an example, a workflow may include model building and may include transforming information. As an example, a workflow may include editing information in a domain and transforming that information after editing.

As an example, a method may include applying for a dip constrained attribute computation. For example, a stratigraphic function may represent dip that may be based in part on manual user interpreted inputs as well as a global dip estimation field. In such an example, uncertainty on the dip field derived from the stratigraphic function may be used as a guide for one or more attribute computations, for example, one or more computations that may benefit from dip correction to enhance results (e.g. curvature, variance, etc.).

As an example, a method may include using a stratigraphic function for property modeling. For example, a stratigraphic function may provide for a high resolution structural model of a sub-surface volume characterized by a seismic survey area and depth of acquisition. In such an example, the latter may be up-scaled, for example, to a desired resolution, and used to create a suitable space for property modeling. As an example, following an iso-value of a stratigraphic function may give a surface in space representing a deformed paleo-topography (cf. deformed by tectonic and subsidence). As an example, where a method includes receiving property values in space (e.g., as from one or more logs), one or more values intersecting a stratigraphic function iso-value may be used as inputs for interpolation (e.g., using existing property modeling algorithm). Such an example may operate in a sim-box-like space (e.g., a Cartesian x,y,T space, etc.) and, for example, may be mapped back onto a corresponding iso-value of the stratigraphic function. As an example, an approach may allow for disabling one or more constraints linked to physically build a Cartesian x,y,T space (e.g. a pillar grid, etc.).

As an example, a method can include generating an implicit function as part of a workflow such as, for example, a workflow performed at least in part via a volume-based structural framework. In such an example, the method may include receiving dip information such as, for example, a dip attribute that may be a seismic "consistent dip" attribute cube. As an example, the method may process the dip information in combination with the implicit function to increase resolution of information, for example, beyond the resolution of the implicit function. Such a method may, for example, generate a stratigraphic function by "flexing" a "relative age cube" locally and "morphing" seismic reflector topology onto it.

As an example, a method may be applied to one or more of a variety of geometries. For example, consider shallow geometries that may exhibit some deformation and deeper geometries that may exhibit more deformation.

As an example, a method can include receiving implicit function values at nodes of a coarse mesh of a region of interest in a geologic environment; receiving data; formulating constraints based at least in part on the data; solving a system of equations for a finer mesh subject to the constraints; and outputting implicit function values at nodes of the finer mesh based at least in part on solving the system of equations. Such a method may include solving the system of equations for residual values.

As an example, a method may include interpolating implicit function values at nodes of a coarse mesh to provide interpolated implicit function values at nodes of a finer mesh. In such an example, a method may include adding the residual values and the interpolated implicit function values (e.g., to output high resolution implicit function values).

As an example, a method may include using at least one processor to solve a system of equations. As an example, implicit function values at nodes of a finer mesh may be stratigraphic function values.

As an example, a method can include computing a shelf break for a geologic environment based at least in part on implicit function values associated with the geologic environment; identifying sea level variations with respect to geological time for the shelf break; and assigning at least one systems tract to the geologic environment based at least in part on the sea level variations. In such an example, the method can include assigning an interface type to a systems tracts interface that includes the at least one systems tract.

As an example, in a method, identifying can include plotting relative eustasy versus relative geological age of at least a portion of the implicit function values, for example, consider a scenario where a shelf break includes a surface that corresponds to a span of geological time.

As an example, a method can include calculating derivative values of the implicit function values (e.g., as part of computing) and, for example, determining inflection points based at least in part on the derivative values.

As an example, a method can include calculating at least one radius of curvature based at least in part on implicit function values.

As an example, a method can include rendering a visualization of at least one systems tract to a display. For example, a method may utilize a computing device that includes at least one processor and memory where information stored in the memory may be rendered to a display via at least one processor (e.g., core, cores, CPU, GPU, etc.). As an example, a graphical user interface may provide for interacting with a visualization rendered to a display, for example, to adjust a view, to adjust one or more parameters (e.g., sea level variation parameters, etc.), to compute one or more values, to split a geologic environment into one or more portions, etc.

As an example, a method may include editing sea level variations with respect to geological time for a shelf break. For example, consider editing that includes stretching sea level variations with respect to geological time, editing that includes squeezing sea level variations with respect to geological time, and/or editing that includes adjusting at least one systems tract anchor with respect to geological time. As an example, a method that includes editing may include rendering a graphical user interface to a display for interactive editing of a plot of sea level variations with respect to geological time. In such an example, the graphical user interface can include a plurality of controls that operate according to receipt of instructions by a computing device (e.g., consider one or more instructions received via a mouse, touch of a touchscreen, a stylus of a digitizer, voice via a microphone, etc.).

As an example, a method can include automatically identifying sea level variations with respect to geological time for a shelf break and, for example, automatically assigning at least one systems tract to a geologic environment based at least in part on the sea level variations.

As an example, a method can include editing sea level variations with respect to geological time for a geologic environment and automatically performing assigning at least one systems tract to the geologic environment based at least in part on the edited sea level variations.

As an example, a method can include computing a shelf break for a geologic environment based at least in part on implicit function values associated with the geologic environment where the computing can include using at least one processor (e.g., of a computing device, a computing system, etc.).

As an example, a system can include a processor; memory operatively coupled to the processor; and one or more modules that include instructions stored in the memory and executable by the processor to instruct the system where the instructions can include instructions to: compute a shelf break for a geologic environment based at least in part on implicit function values associated with the geologic environment; identify sea level variations with respect to geological time for the shelf break; and assign at least one systems tract to the geologic environment based at least in part on the sea level variations. In such an example, the system may include an edit module to interactively edit the sea level variations with respect to geological time.

As an example, one or more computer-readable storage media that include computer-executable instructions to instruct a computing device can include instructions to: compute a shelf break for a geologic environment based at least in part on implicit function values associated with the geologic environment; identify sea level variations with respect to geological time for the shelf break; and assign at least one systems tract to the geologic environment based at least in part on the sea level variations. In such an example, instructions may be included to interactively edit the sea level variations with respect to geological time.

Figure 18:
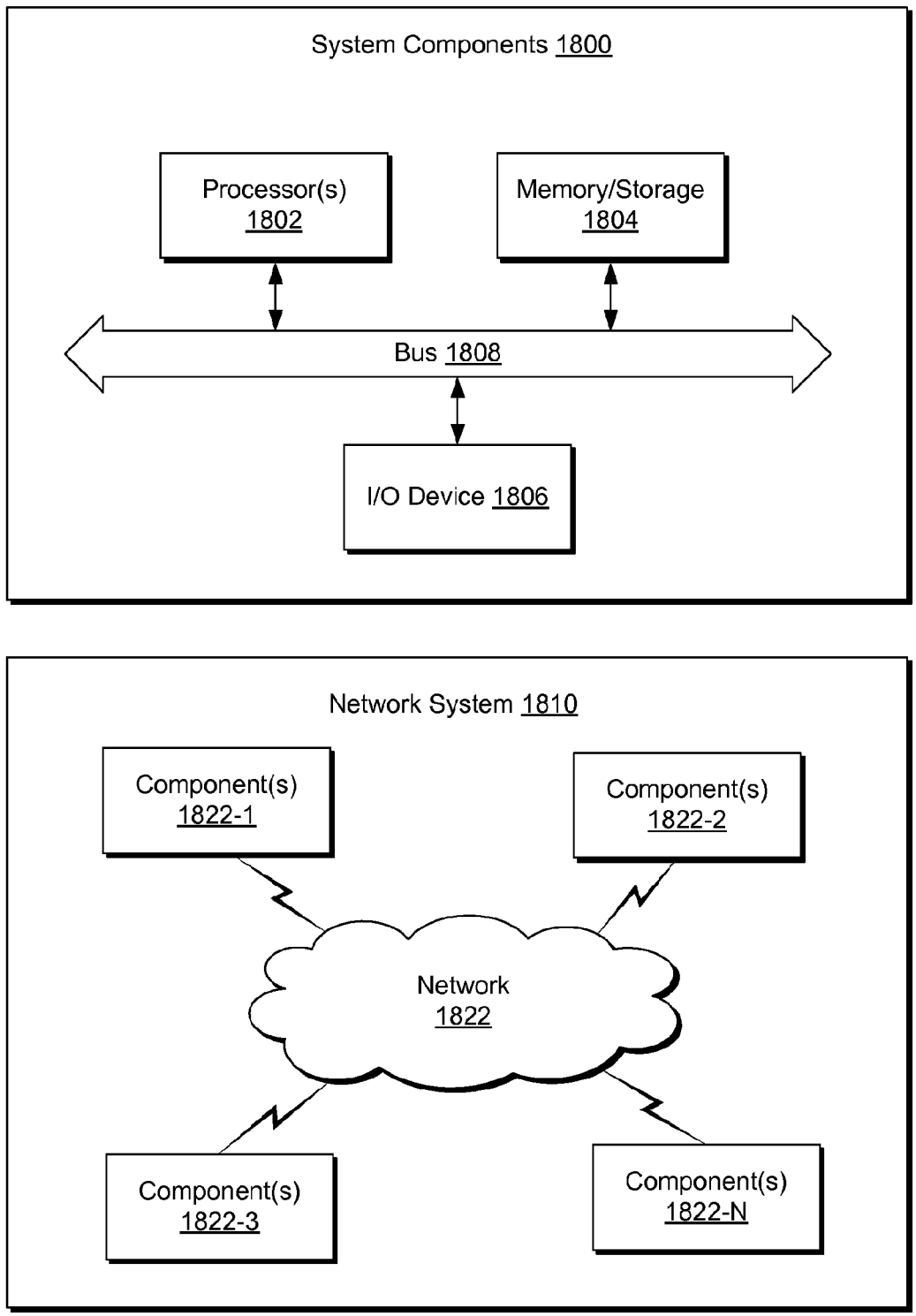
FIG. 18 illustrates example components of a system and a networked system.

FIG. 18 shows components of an example of a computing system 1800 and an example of a networked system 1810. The system 1800 includes one or more processors 1802, memory and/or storage components 1804, one or more input and/or output devices 1806 and a bus 1808. In an example embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. The one or more processors may execute such instructions to implement (wholly or in part) one or more attributes (e.g., as part of a method). A user may view output from and interact with a process via an I/O device (e.g., the device 1806). In an example embodiment, a computer-readable medium may be a storage component such as a physical memory storage device, for example, a chip, a chip on a package, a memory card, etc. (e.g., a computer-readable storage medium that is non-transitory and not a carrier wave).

In an example embodiment, components may be distributed, such as in the network system 1810. The network system 1810 includes components 1822-1, 1822-2, 1822-3, . . . 1822-N. For example, the components 1822-1 may include the processor(s) 1802 while the component(s) 1822-3 may include memory accessible by the processor(s) 1802. Further, the component(s) 1802-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen, a digitizer, etc.), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

The invention claimed is:

1. A method comprising:
computing a shelf break for a geologic environment based at least in part on implicit function values associated with the geologic environment;
identifying sea level variations with respect to geological time for the shelf break;
assigning at least one systems tract to the geologic environment based at least in part on the sea level variations and;
editing the sea level variations with respect to geological time for the shelf break.

2. The method of claim 1, further comprising assigning an interface type to a systems tracts interface that comprises the at least one systems tract.

3. The method of claim 1, wherein the identifying comprises plotting relative eustasy versus relative geological age of at least a portion of the implicit function values.

4. The method of claim 3, wherein the shelf break comprises a surface that corresponds to a span of geological time.

5. The method of claim 1, wherein the computing comprises calculating derivative values of the implicit function values.

6. The method of claim 5, further comprising determining inflection points based at least in part on the derivative values.

7. The method of claim 1, further comprising calculating at least one radius of curvature based at least in part on the implicit function values.

8. The method of claim 1, further comprising rendering a visualization of the at least one systems tract to a display.

9. The method of claim 1, wherein the editing comprises stretching sea level variations with respect to geological time.

10. The method of claim 1, wherein the editing comprises squeezing sea level variations with respect to geological time.

11. The method of claim 1, wherein the editing comprises adjusting at least one systems tract anchor with respect to geological time.

12. The method of claim 1, further comprising rendering a graphical user interface to a display for interactive editing of a plot of the sea level variations with respect to geological time.

13. The method of claim 1, further comprising automatically identifying sea level variations with respect to geological time for the shelf break; and automatically assigning at least one systems tract to the geologic environment based at least in part on the sea level variations.

14. The method of claim 1, further comprising editing the sea level variations with respect to geological time and automatically performing the assigning.

15. The method of claim 1, wherein the computing comprises using at least one processor.

16. A system comprising:
   a processor;
   memory operatively coupled to the processor; and
   one or more modules that comprise instructions stored in the memory and executable by the processor to instruct the system wherein the instructions comprise instructions to:
   compute a shelf break for a geologic environment based at least in part on implicit function values associated with the geologic environment;
   identify sea level variations with respect to geological time for the shelf break;
   assign at least one systems tract to the geologic environment based at least in part on the sea level variations and;
   edit the sea level variations with respect to geological time for the shelf break.

17. One or more computer-readable, non-transitory storage media that comprise computer-executable instructions to instruct a computing device, the instructions comprising instructions to:
   compute a shelf break for a geologic environment based at least in part on implicit function values associated with the geologic environment;
   identify sea level variations with respect to geological time for the shelf break;
   assign at least one systems tract to the geologic environment based at least in part on the sea level variations and;
   edit the sea level variations with respect to geological time for the shelf break.

* * * * *